(12) United States Patent
Ahn et al.

(10) Patent No.: US 7,889,304 B2
(45) Date of Patent: Feb. 15, 2011

(54) LIQUID CRYSTAL DISPLAY AND FABRICATING METHOD THEREOF

(75) Inventors: Byung Chul Ahn, Seoul (KR); Soon Sung Yoo, Gunpo-si (KR); Oh Nam Kwon, Yongin-si (KR); Youn Gyoung Chang, Anyang-si (KR); Heung Lyul Cho, Suwon-si (KR); Seung Hee Nam, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/785,161

(22) Filed: May 21, 2010

(65) Prior Publication Data

US 2010/0225869 A1 Sep. 9, 2010

Related U.S. Application Data

(62) Division of application No. 11/471,653, filed on Jun. 21, 2006, now Pat. No. 7,751,021.

(30) Foreign Application Priority Data

Jun. 27, 2005 (KR) ............... 10-2005-0055973

(51) Int. Cl.
*G02F 1/1343* (2006.01)
*G02F 1/1345* (2006.01)
*G02F 1/1368* (2006.01)
*G02F 1/139* (2006.01)

(52) U.S. Cl. ............... 349/141; 349/38; 349/43; 349/147; 349/149

(58) Field of Classification Search ............ 349/38, 349/42, 43, 141, 147, 149, 39; 257/59, 72; 345/92
See application file for complete search history.

(56) References Cited

U.S. PATENT DOCUMENTS

| 5,162,933 A | 11/1992 | Kakuda et al. |
| 5,317,433 A | 5/1994 | Miyawaki et al. |
| 5,339,181 A | 8/1994 | Kim et al. |
| 5,462,887 A | 10/1995 | Glueck |
| 5,668,379 A | 9/1997 | Ono et al. |
| 5,731,856 A | 3/1998 | Kim et al. |

(Continued)

FOREIGN PATENT DOCUMENTS

CN 1550857 12/2001

(Continued)

*Primary Examiner*—David Nelms
*Assistant Examiner*—Tai Duong
(74) *Attorney, Agent, or Firm*—McKenna Long & Aldridge LLP

(57) ABSTRACT

A liquid crystal display device and a fabricating method thereof for simplifying a process are disclosed. In the method of fabricating the liquid crystal display device, a first conductive pattern group including a gate line and a gate electrode, a common line and a common electrode, a pixel electrode and a pad is formed on a substrate. An insulating film including a plurality of contact holes and a semiconductor pattern is formed on the first mask pattern group. And a second conductive pattern group including a data line, a source electrode and a drain electrode is formed on an insulating film provided with the semiconductor pattern, and exposes an active layer of the semiconductor pattern.

14 Claims, 32 Drawing Sheets

U.S. PATENT DOCUMENTS

| | | |
|---|---|---|
| 5,771,083 A | 6/1998 | Fujihara et al. |
| 5,793,460 A | 8/1998 | Yang |
| 5,847,781 A | 12/1998 | Ono et al. |
| 2001/0035527 A1 | 11/2001 | Tanaka et al. |
| 2003/0022526 A1 | 1/2003 | Vyvoda et al. |
| 2005/0078259 A1 | 4/2005 | Ahn et al. |
| 2005/0092990 A1 | 5/2005 | Yoo et al. |
| 2007/0002249 A1 | 1/2007 | Yoo et al. |

FOREIGN PATENT DOCUMENTS

| | | |
|---|---|---|
| JP | 2005-122185 | 5/2005 |

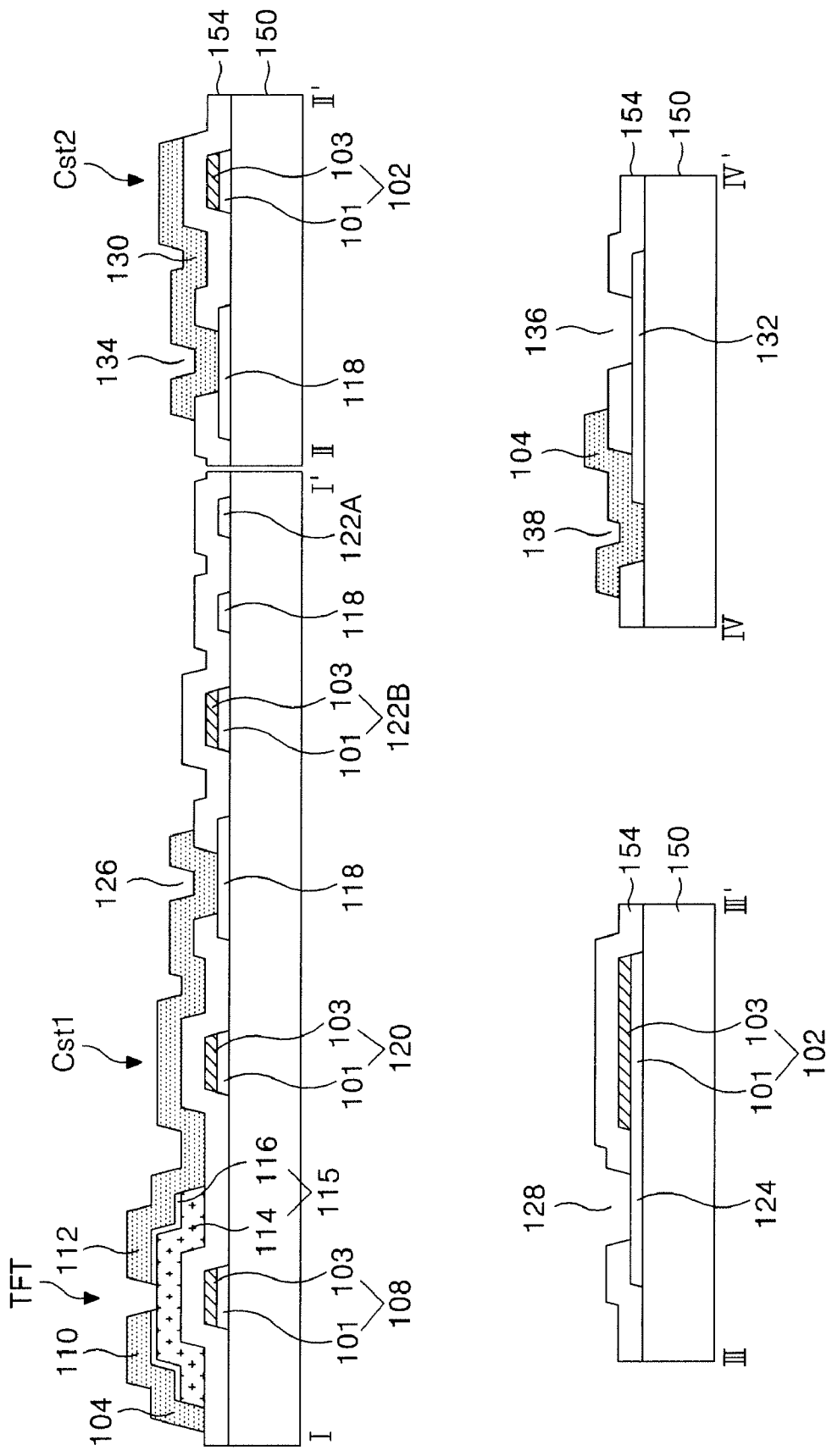

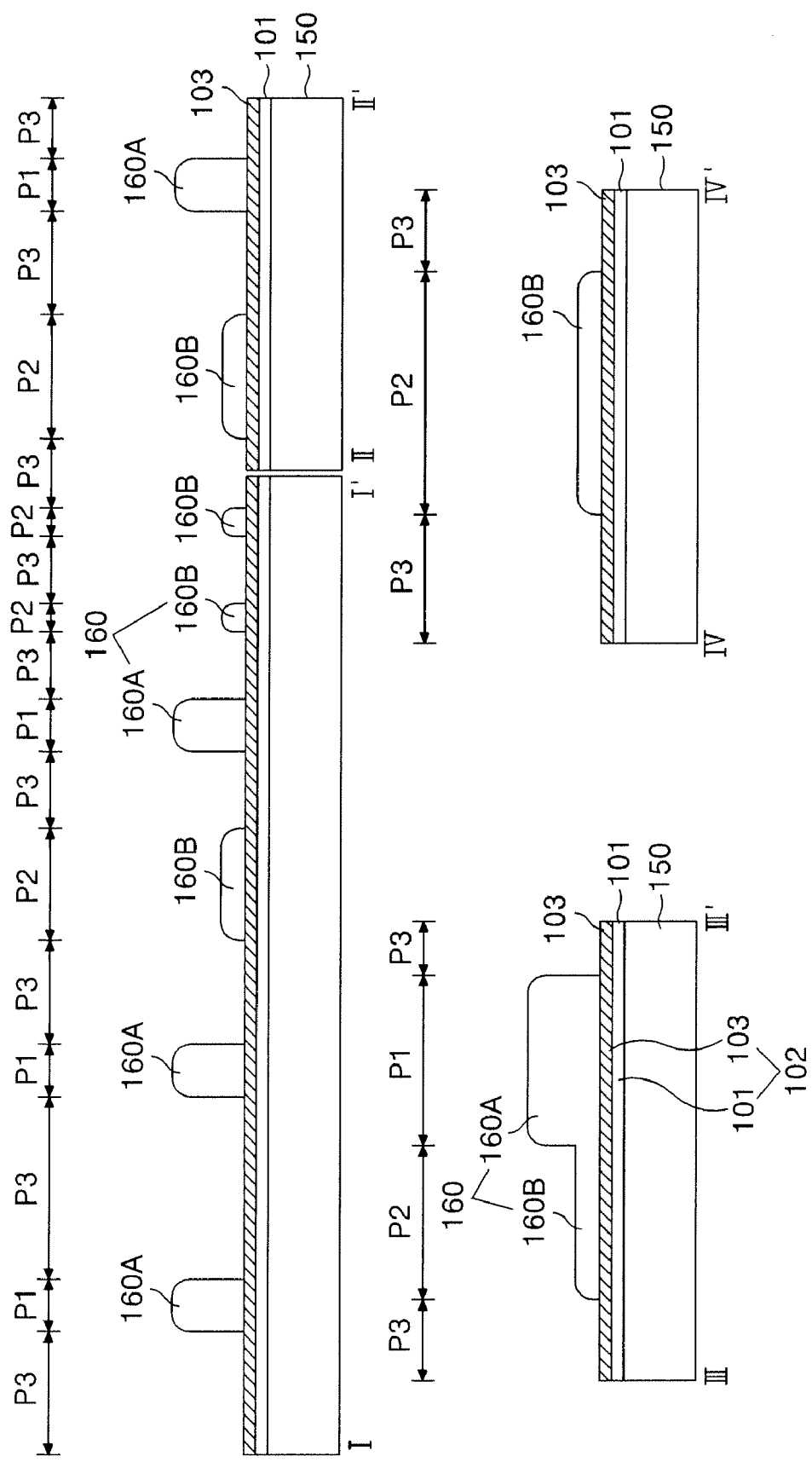

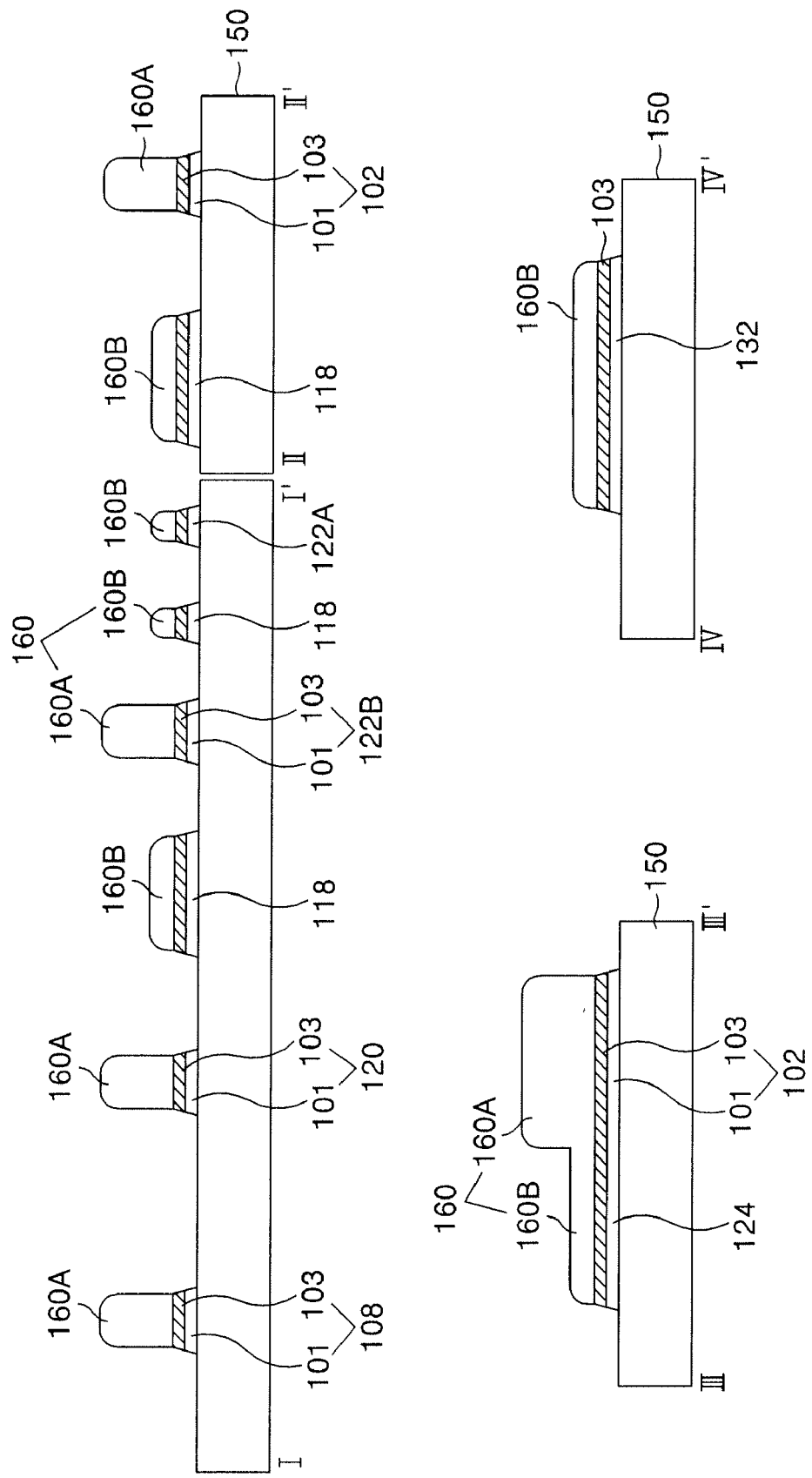

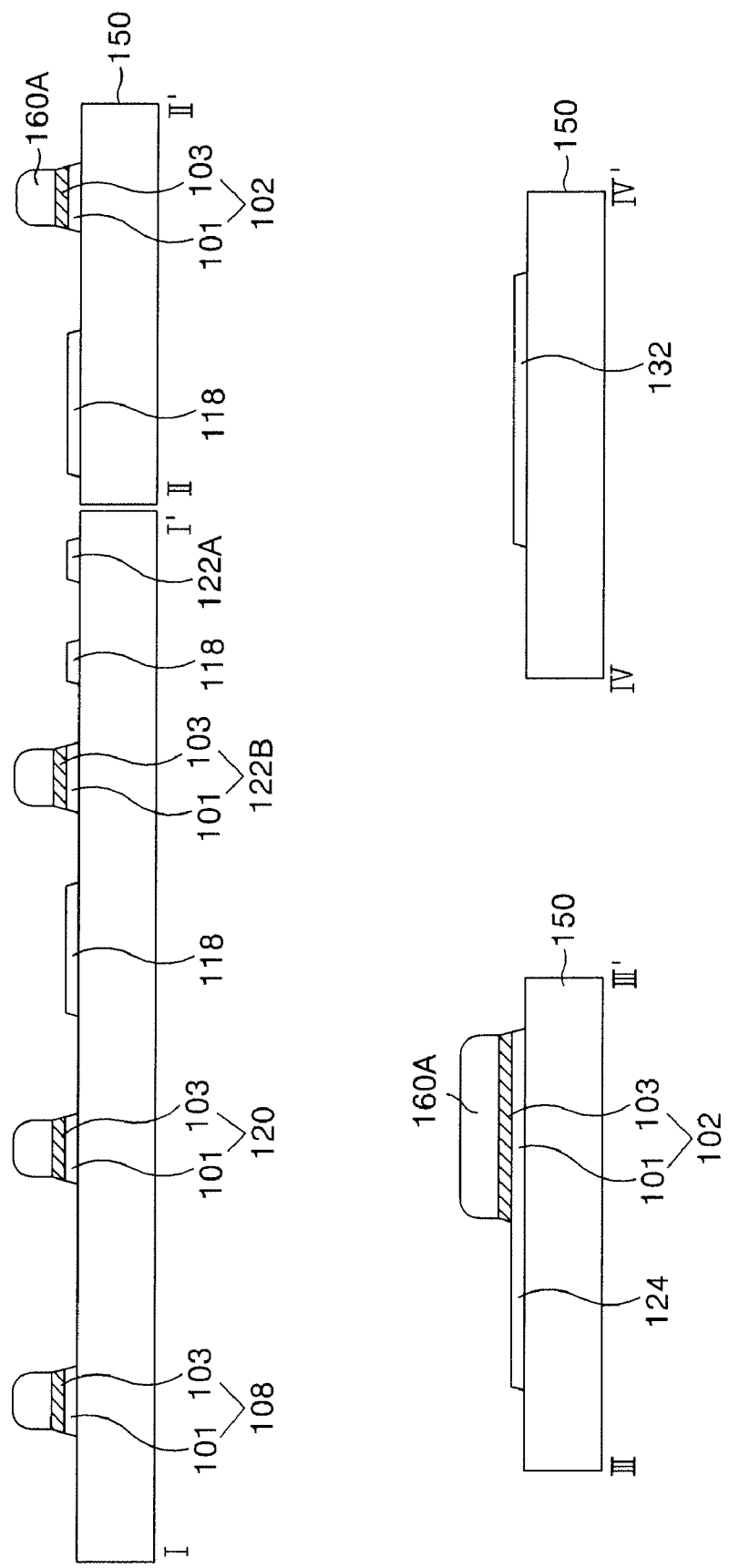

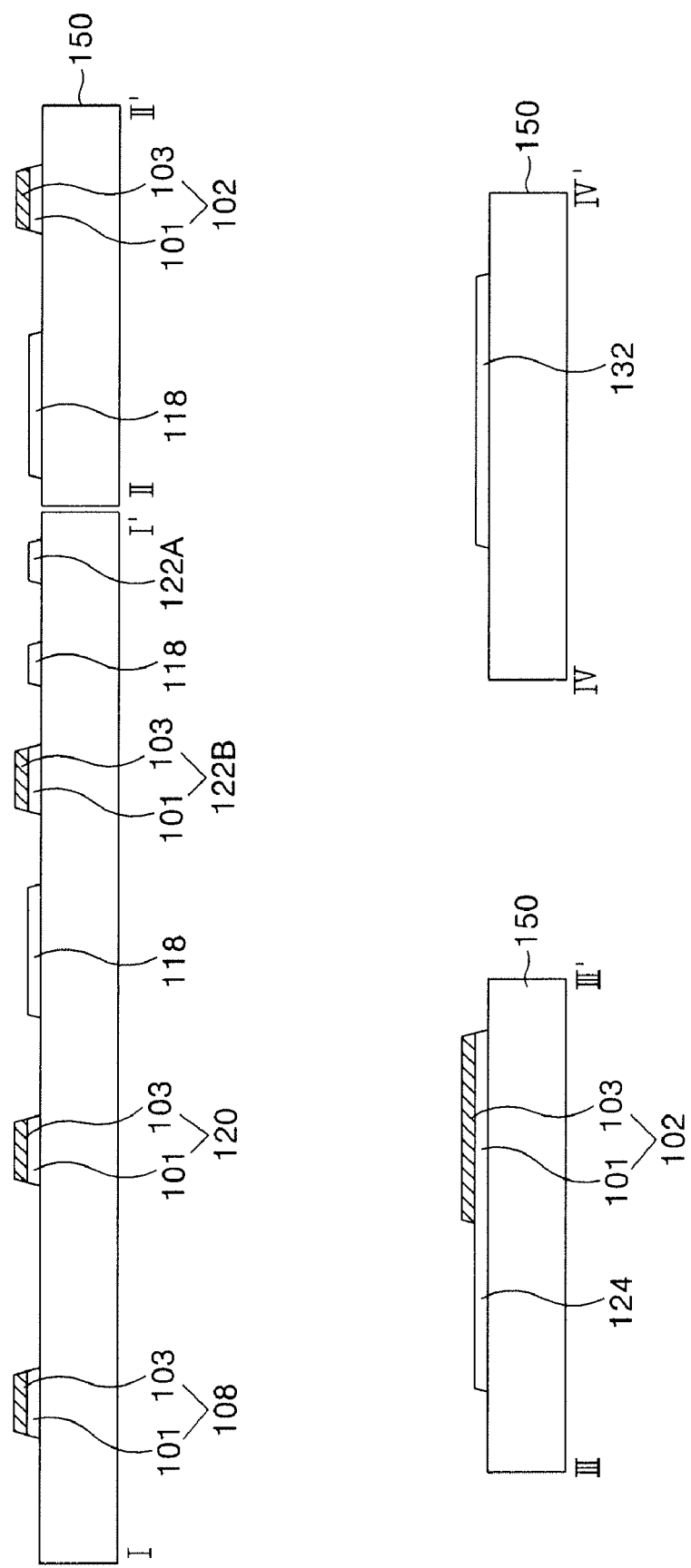

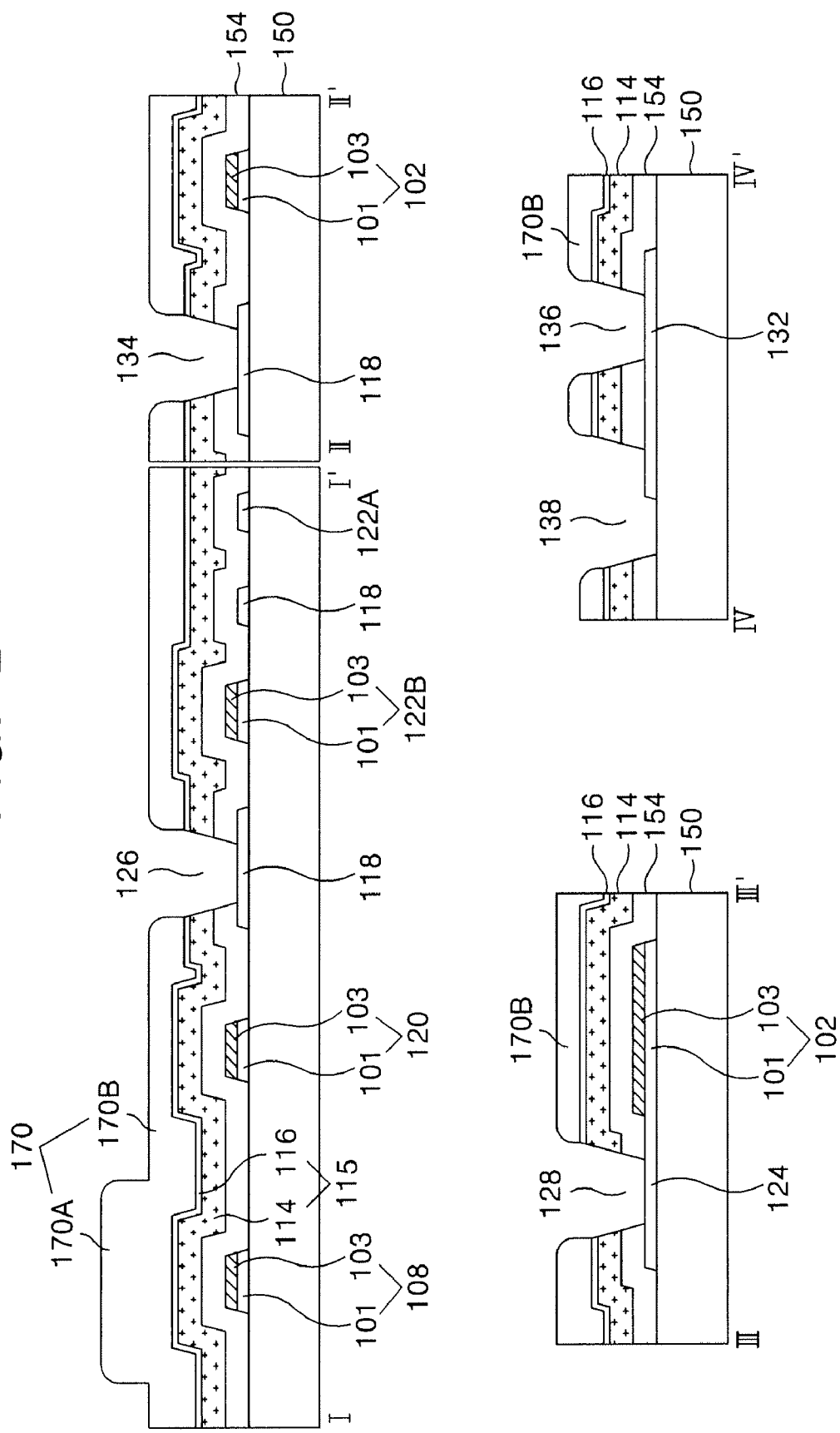

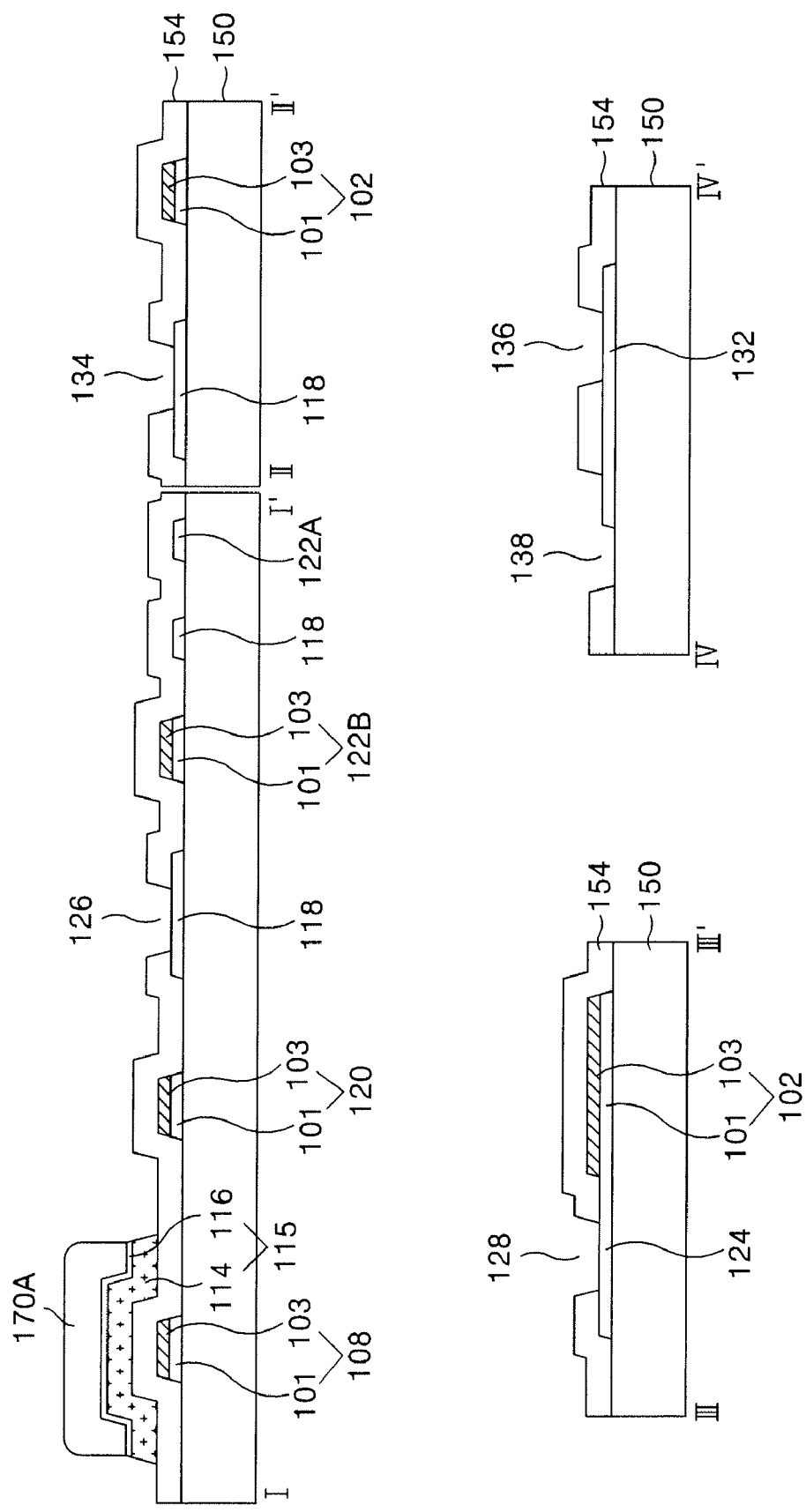

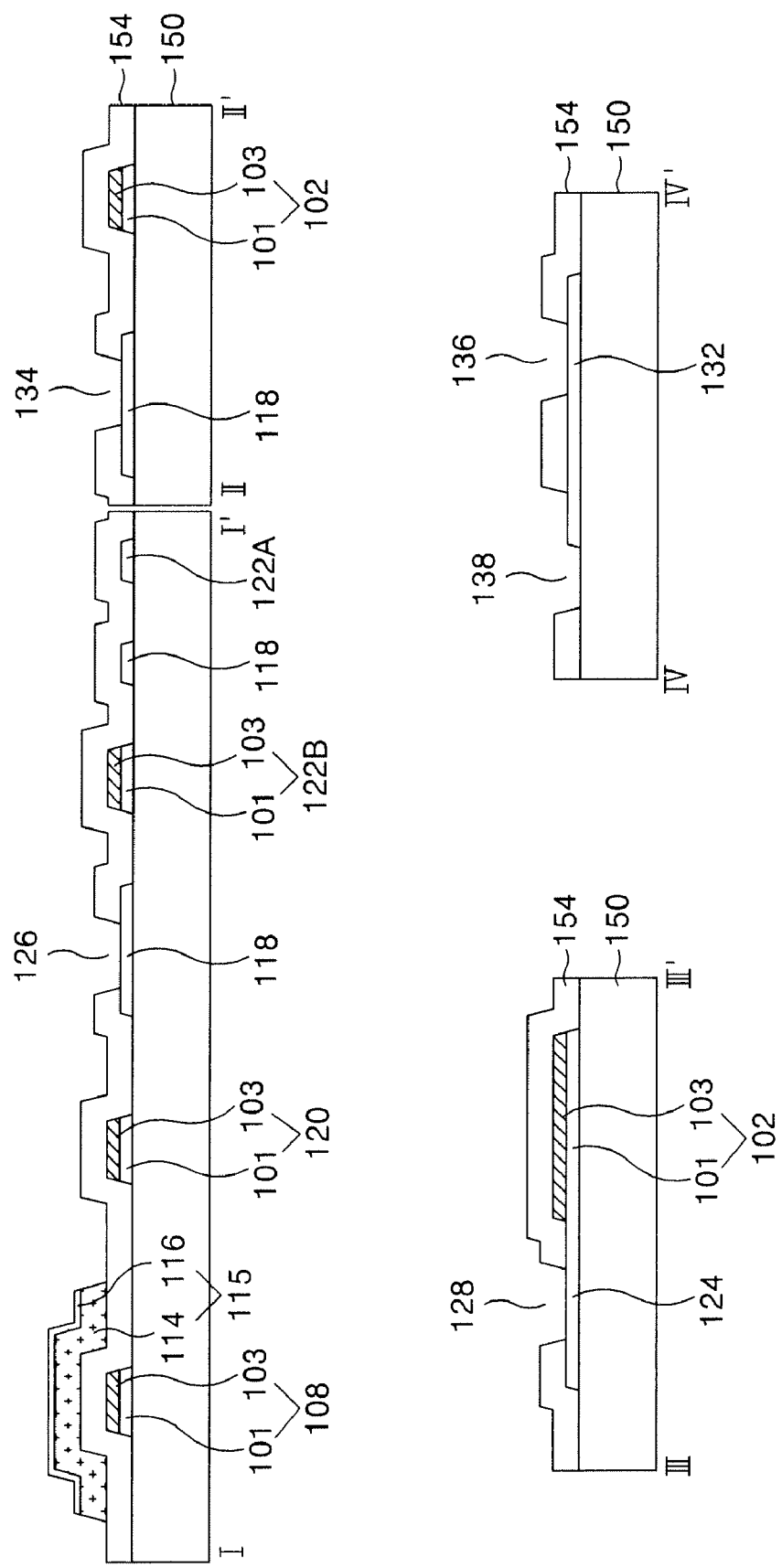

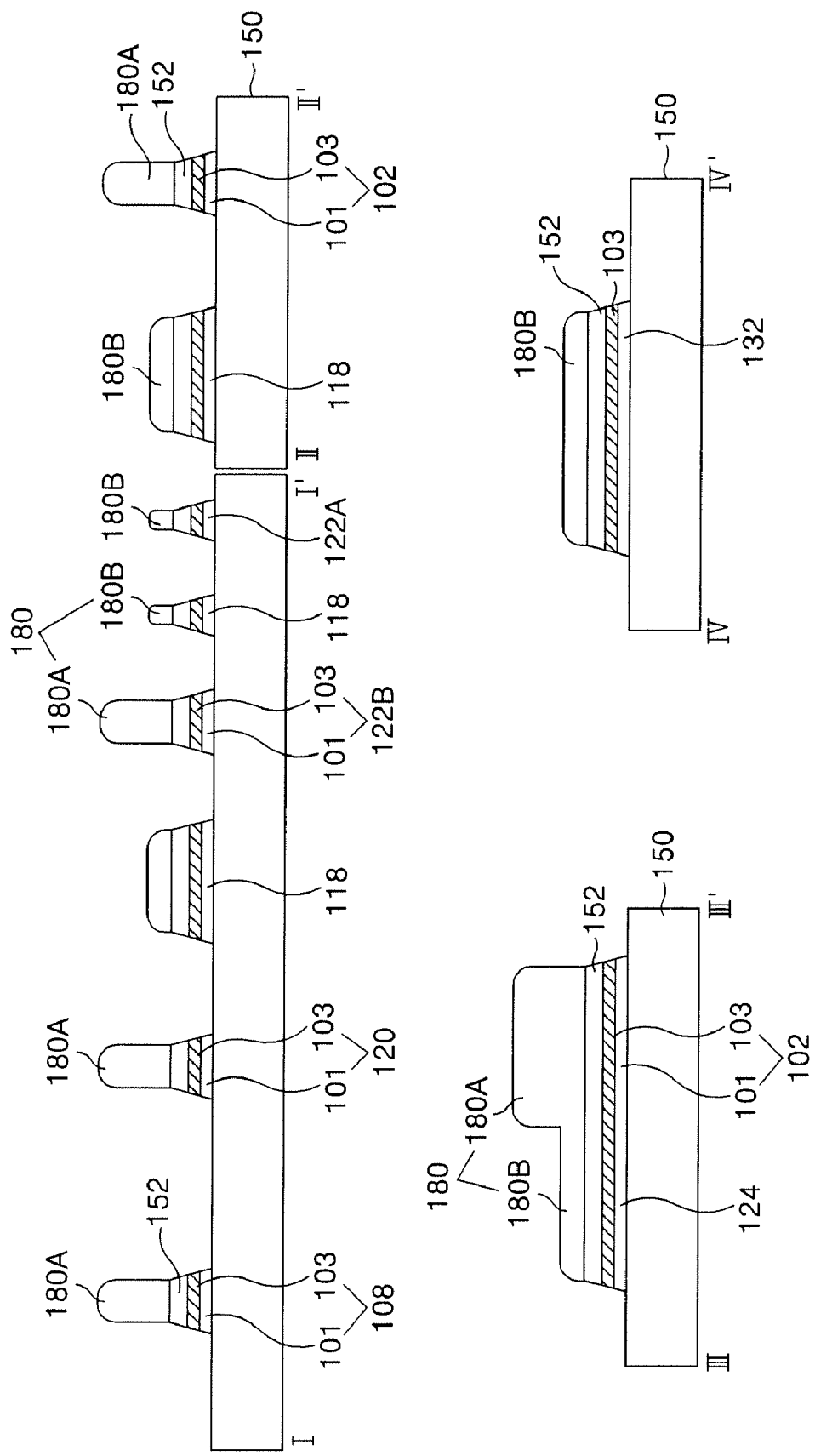

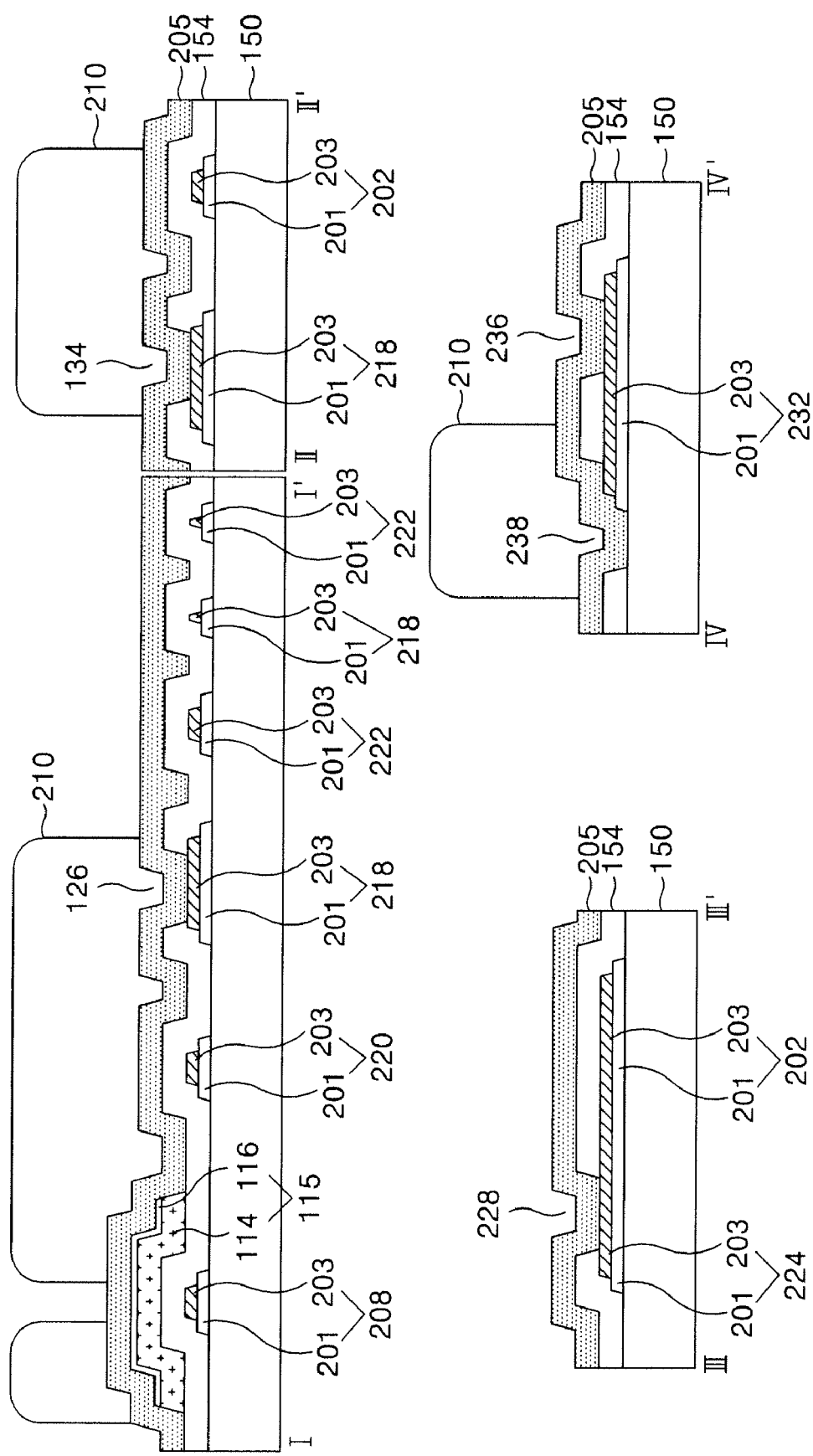

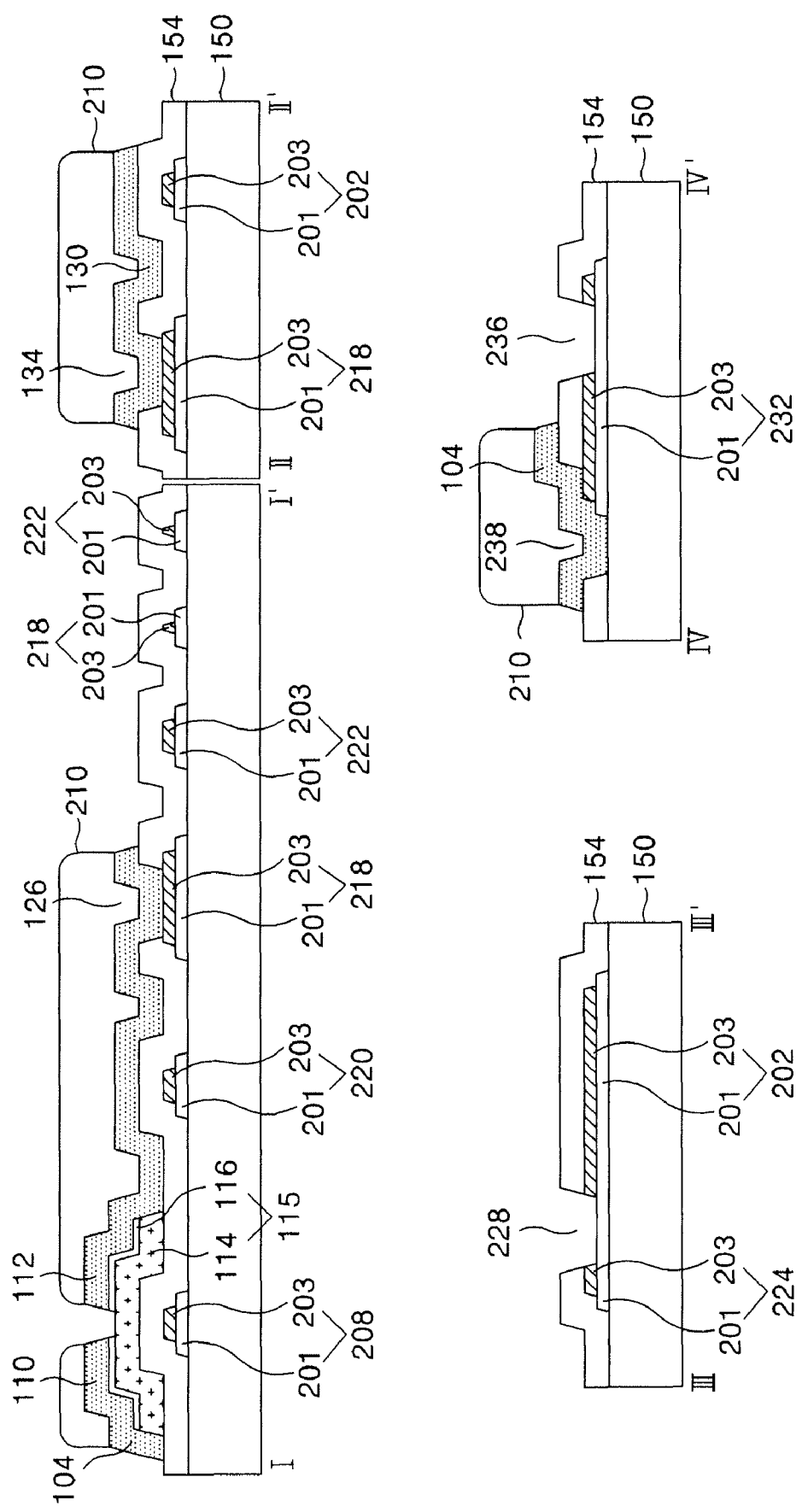

LIQUID CRYSTAL DISPLAY AND FABRICATING METHOD THEREOF

CROSS-REFERENCE TO RELATED APPLICATIONS

This application is a Divisional of application Ser. No. 11/471,653 filed Jun. 21, 2006, now U.S. Pat. No. 7,751,021, which claims priority to Korean Patent Application No. 10-2005-0055973, filed Jun. 27, 2005, all of which are hereby incorporated by reference for all purposes as if fully set forth herein.

BACKGROUND OF THE INVENTION

1. Field of the Invention

This invention relates to a liquid crystal display device, and more particularly to a liquid crystal display device of horizontal electric field applying type and a fabricating method thereof that are adaptive for simplifying a process.

2. Description of the Related Art

Generally, a liquid crystal display device (LCD) uses an electric field to control light transmittance through a liquid crystal having a dielectric anisotropy to thereby display a picture. To this end, the LCD includes a liquid crystal display panel that has a matrix of liquid crystal cells, and a driving circuit for driving the liquid crystal display panel to display a picture.

Referring to FIG. 1, a related art liquid crystal display panel includes of a color filter substrate 10 and the thin film transistor substrate 20 that are joined to each other with a liquid crystal 24 therebetween.

The color filter substrate 10 includes a black matrix 4, a color filter 6 and a common electrode 8 that are sequentially provided on an upper glass substrate 2. The black matrix 4 is provided in a matrix on the upper glass substrate 2. The black matrix 4 divides an area of the upper glass substrate 2 into a plurality of cell areas to be provided with the color filter 6 and prevents light interference between adjacent cells and an external light reflection. The color filter 6 is provided at the cell area divided by the black matrix 4 to provide red(R), green(G) and blue(B) cell areas, thereby transmitting red, green and blue lights. The common electrode 8 is formed of a transparent conductive layer entirely coated onto the color filter 6 and supplies a common voltage Vcom that serves as a reference voltage upon driving of the liquid crystal 24. Further, an overcoat layer (not shown) for smoothing the color filter 6 may be provided between the color filter 6 and the common electrode 8.

The thin film transistor substrate 20 includes a thin film transistor 18 and a pixel electrode 22 for each cell area defined by crossing between gate lines 14 and data lines 16 on a lower glass substrate 12. The thin film transistor 18 applies a data signal from the data line 16 to the pixel electrode 22 in response to a gate signal from the gate line 14. The pixel electrode 22 formed of a transparent conductive layer supplies a data signal from the thin film transistor 18 to drive the liquid crystal 24.

The liquid crystal 24 having a dielectric anisotropy is rotated in accordance with an electric field formed by a data signal from a pixel electrode 22 and a common voltage Vcom from the common electrode 8 to control light transmittance, thereby implementing a gray scale level.

Further, the liquid crystal display panel includes an alignment film for initial aligning of the liquid crystal, and a spacer (not shown) for constantly keeping a cell gap between the color filter substrate 10 and the thin film transistor substrate 20.

In such a liquid crystal display panel, the color filter substrate 10 and the thin film transistor substrate 20 are formed by a plurality of mask processes. Herein, one mask process includes a lot of processes such as thin film deposition (coating), cleaning, photolithography, etching, photo-resist stripping and inspection processes, etc.

Particularly, since the thin film transistor substrate includes the semiconductor process and requires the plurality of mask processes, it has a complicated fabricating process to which contributes the high manufacturing cost of the liquid crystal display panel. Therefore, research and development toward a reduction in the number of mask process is continuing.

The liquid crystal displays are largely classified into a vertical electric field applying type and a horizontal electric field applying type depending upon a direction of the electric field driving the liquid crystal.

The liquid crystal display device of vertical electric field applying type drives a liquid crystal in a twisted nematic (TN) mode with a vertical electric field formed between a pixel electrode and a common electrode arranged in opposition to each other on the upper and lower substrate. The liquid crystal display device of vertical electric field applying type has an advantage of a large aperture ratio, while having a drawback of a narrow viewing angle about 90°.

The liquid crystal display device of horizontal electric field applying type drives a liquid crystal in an in plane switching (IPS) mode with a horizontal electric field between the pixel electrode and the common electrode arranged parallel to each other on the lower substrate. The liquid crystal display device of horizontal electric field applying type has an advantage of a wide viewing angle about 160°.

The thin film transistor substrate in the liquid crystal display device of horizontal electric field applying type also requires a plurality of mask processes which has a drawback of a complicated fabricating process. Therefore, in order to reduce the manufacturing cost, it is necessary to reduce the number of mask processes.

SUMMARY OF THE INVENTION

Accordingly, the present invention is directed to a liquid crystal display and fabricating method thereof that substantially obviates one or more of the problems due to limitations and disadvantages of the related art.

Accordingly, it is an advantage of the present invention to provide a liquid crystal display device of horizontal electric field applying type and a fabricating method thereof having a simplified manufacturing process.

In order to achieve these and other advantages of the invention, the liquid crystal display device according to one aspect of the present invention comprises a data line crossing a gate line on a substrate to define a pixel area; an insulating film between the gate line and the data line; a thin film transistor connected to the gate line and the data line; a pixel electrode connected to the thin film transistor in the pixel area; a common electrode being parallel to the pixel electrode in the pixel area; a common line connected to the common electrode; a pad connected to at least one of the gate line, the data line and the common line; and the gate line, the gate electrode, the pixel electrode, the common electrode, the common line, and the pad include a transparent conductive layer.

In the liquid crystal display device, the gate line, the gate electrode and the common line have a multiple-layer structure including the transparent conductive layer and a substantially opaque conductive layer.

In the liquid crystal display device, a portion of the common electrode has a multiple-layer structure having the transparent conductive layer and a substantially opaque conductive layer, and another portion of the common electrode is formed of the transparent conductive layer.

In the liquid crystal display device, the pixel electrode and the pad are formed of the transparent conductive layer.

In the liquid crystal display device, the gate line, the gate electrode, the common line, the common electrode, the pixel electrode and the pad have a multiple-layer structure including the transparent conductive layer and a substantially opaque conductive layer.

In the liquid crystal display device, the transparent conductive layer is formed in such a manner to substantially constantly expose along an outside of the substantially opaque conductive layer.

In the liquid crystal display device, the pad is formed in such a manner to expose the transparent conductive layer through a contact hole passing through the substantially opaque conductive layer.

The liquid crystal display device further comprises a storage capacitor provided such that the drain electrode of the thin film transistor overlaps with a portion of the common electrode with the insulating film therebetween.

The liquid crystal display device further comprises a storage capacitor provided such that an upper storage electrode connected to the pixel electrode overlaps with a portion of the gate line with the insulating film therebetween.

In the liquid crystal display device, the drain electrode and the upper storage electrode are connected to the pixel electrode via a contact hole passing through the insulating film.

In the liquid crystal display device, a surface of a channel exposed between the source electrode and the drain electrode of the thin film transistor is oxidized.

In the liquid crystal display device, the thin film transistor and the data line are protected by an alignment film.

The liquid crystal display device further comprises a second insulating film on a multiple conductive layer including the transparent conductive layer of the gate line, the gate electrode, the pixel electrode, the common electrode, the common line and the pad.

In the liquid crystal display device, the data line is connected to the pad via a contact hole passing through the insulating film.

In another aspect of the present invention, a method of fabricating a liquid crystal display device according to an embodiment of the present invention comprises forming a first conductive pattern group including a gate line and a gate electrode, a common line and a common electrode, a pixel electrode and a pad on a substrate; forming a insulating film including a plurality of contact holes and a semiconductor pattern on the first mask pattern group; and forming a second conductive pattern group including a data line, a source electrode and a drain electrode on the insulating film and exposing an active layer of the semiconductor pattern.

In the method, the gate line, the gate electrode and the common line have a multiple-layer structure including a transparent conductive layer and a substantially opaque conductive layer.

In the method, a portion of the common electrode has a multiple-layer structure having a transparent conductive layer and a substantially opaque conductive layer, and another portion of the common electrode is formed of the transparent conductive layer.

In the method, the pixel electrode and the pad are formed of a transparent conductive layer.

In the method, forming the first conductive pattern group includes forming a transparent conductive layer and a substantially opaque conductive layer on the substrate; patterning the transparent conducive layer and the substantially opaque conductive layer; and removing a portion of the substantially opaque conductive layer.

In the method, the first conductive pattern group is formed by using one of a half tone mask and a diffractive exposure mask.

In the method, the gate line, the gate electrode, the common line, the common electrode, the pixel electrode and the pad have a multiple-layer structure including the transparent conductive layer and the substantially opaque conductive layer.

In the method, the transparent conductive layer is formed in such a manner to substantially constantly expose along an outside of the substantially opaque conductive layer.

In the method, forming the first conductive pattern group includes forming the transparent conductive layer and the substantially opaque conductive layer on the substrate; forming a photo-resist pattern on the substantially opaque conductive layer; patterning the transparent conductive layer and the substantially opaque conductive layer by the photo-resist pattern as a mask; ashing the photo-resist pattern; and etching the substantially opaque conductive layer exposed through the ashed photo-resist pattern.

In the method, the pad is formed in such a manner to expose the transparent conductive layer through a contact hole passing through the substantially opaque conductive layer.

In the method, forming the insulating film and the semiconductor pattern include forming a insulating film and a semiconductor pattern on the substrate; forming the plurality of contact holes passing through the insulting film; and the forming the semiconductor pattern by patterning the semiconductor layer.

In the method, the plurality of contact holes and the semiconductor pattern are formed by using one of a half tone mask and a diffractive exposure mask.

The method further comprises forming a storage capacitor by overlapping the drain electrode with a portion of the common electrode with the insulating film therebetween.

The method further comprises forming an upper storage electrode connected to the pixel electrode, and overlapped with a portion of the gate line with the insulating film therebetween along with the second conductive pattern group.

In the method, the drain electrode and the upper storage electrode are connected to the pixel electrode via a contact hole passing through the insulating film.

The method further comprises oxidizing a surface of an active layer exposed between a source electrode and a drain electrode of the thin film transistor by a plasma surface process.

In the method, the plasma surface process performs on the condition that a photo-resist pattern remains for forming the second conductive pattern group.

The method further comprises forming an alignment film for covering the second conductive pattern group.

In the method forming the first conductive pattern group further includes forming a second insulating film on a multiple conductive layer including the transparent conductive layer of the gate line, the gate electrode, the pixel electrode, the common electrode, the common line and the pad.

In the method, the data line is connected to the pad via a contact hole passing through the insulating film.

In the method, a substantially opaque conductive layer of the pad exposed through the contact hole is removed upon forming of the second conductive pattern group.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a sectional view of the thin film transistor substrate taken along the I-I', II-II', III-III', IV-IV' lines in FIG. 2;

FIG. 5A to FIG. 5D are sectional views for specifically explaining the first mask process according to the first embodiment of the present invention;

FIG. 7A to FIG. 7D are sectional views for specifically explaining the second mask process according to the first embodiment of the present invention;

FIG. 10A to FIG. 10D are sectional views for specifically explaining a first mask process in a method of fabricating the thin film transistor substrate according to a second embodiment of the present invention;

FIG. 15A to FIG. 15C are sectional views for specifically explaining a third mask process of the thin film transistor substrate according to the third embodiment of the present invention;

DETAILED DESCRIPTION OF THE ILLUSTRATED EMBODIMENT

Reference will now be made in detail to an embodiment of the present invention, example of which is illustrated in the accompanying drawings.

Figure 1:
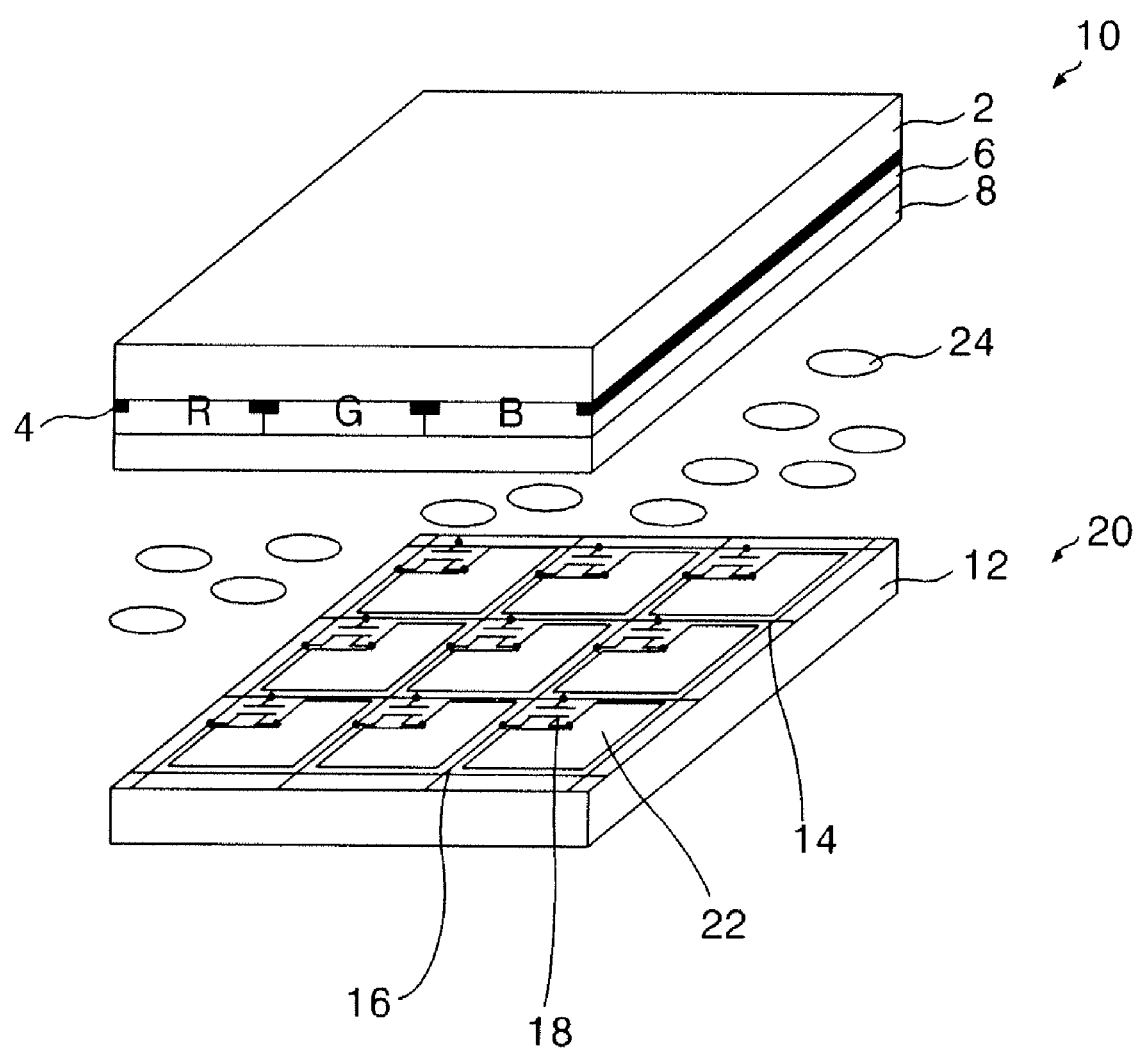
FIG. 1 is a schematic perspective view showing a structure of a related art liquid crystal display panel.
Figure 2:
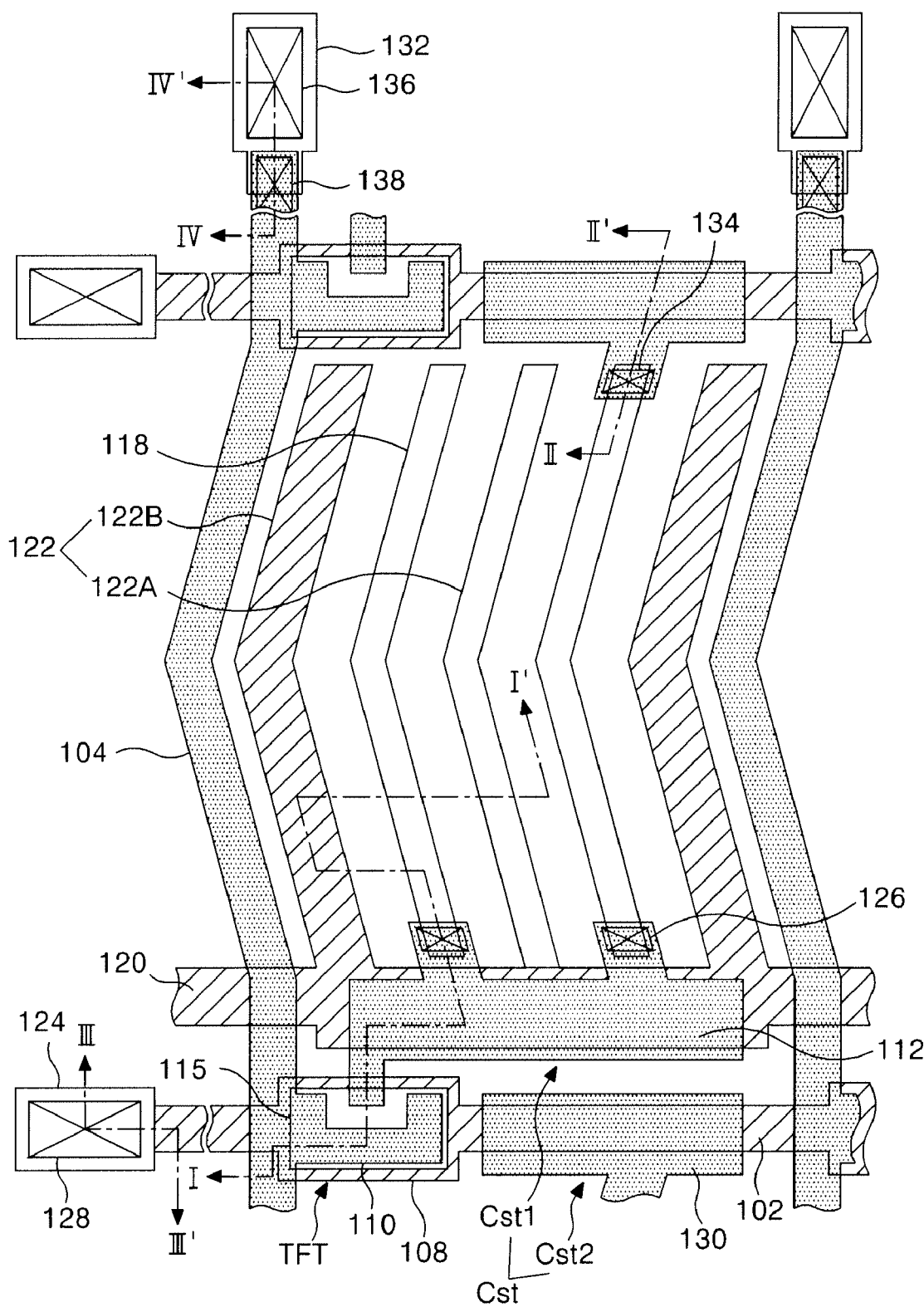
FIG. 2 is a plan view illustrating a portion of a thin film transistor substrate of a liquid crystal display device according to a first embodiment of the present invention.

FIG. 2 is a plan view illustrating a portion of a thin film transistor substrate of a liquid crystal display device of horizontal electric field applying type according to a first embodiment of the present invention; and FIG. 3 is a sectional view of the thin film transistor substrate taken along the I-I', II-II', III-III', IV-IV' lines in FIG. 2.

Referring to FIG. 2 and FIG. 3, the thin film transistor substrate of horizontal electric field applying type includes a gate line 102 and a data line 104 provided on a lower substrate 150 in such a manner to cross each other with a gate insulating film 152 therebetween and to define a pixel area. A thin film transistor TFT is connected to the gate line 102, the data line 104 a pixel connecting line 11a, a pixel electrode 118 and a common electrode 122 provided to form a horizontal electric field at the pixel area. A common line 120 is connected to the common electrode 122, and a storage capacitor Cst is connected to a pixel electrode 118. Further, the thin film transistor substrate includes a gate pad 124 connected to the gate line 102, a data pad 132 connected to the data line 104, and a common pad (not shown) connected to the common line 120.

The gate line 102 supplies a scanning signal from a gate driver (not shown) while the data line 104 supplies a video signal from a data driver (not shown). The gate line 102 and the data line 104 cross each other with a gate insulating film 152 therebetween to define each pixel area.

The thin film transistor TFT allows a video signal applied to the data line 104 to be charged into a pixel electrode 118 and be held in response to a scanning signal applied to the gate line 102. To this end, the thin film transistor TFT includes a gate electrode 108 connected to the gate line 102, a source electrode 110 connected to the data line 104, a drain electrode 112 positioned in opposition to the source electrode 110 and connected to a pixel electrode 118 via a pixel connecting line 118a, an active layer 114 overlapping with the gate electrode 108 with the gate insulating film 154 therebetween to define a channel between the source electrode 110 and the drain electrode 112, and an ohmic contact layer 116 for making an ohmic contact with an active layer 114, the source electrode 110 and the drain electrode 112.

The gate line 102 and the gate electrode 108 are formed on the substrate 150 in a multiple-layer structure having at least double layers with a transparent conductive layer. For example, illustrated in FIG. 3, the gate line 102 has a double-layer structure in which a first conductive layer 101 employing a transparent conductive layer and a second conductive layer 103 formed of a substantially opaque metal are built.

The common line 120 supplies, via the common electrode 122, a reference voltage for driving the liquid crystal, that is, a common voltage to each pixel. The common line 120 is formed in a multiple-layer structure having at least a first conductive layer 101 and a second conductive layer 103 like the above-mentioned gate line 102.

A plurality of common electrodes 122 within the pixel area extend from the common line 120 subsequently in parallel to the pixel electrode 118. Such common electrode 122 is formed in a multiple-layer structure having at least the first conductive layer and second conductive layers 101 and 103 like the above-mentioned common line 120. On the other hand, the common electrode 122 may be formed only of the first transparent conductive layer 101. Also, a portion of the common electrode 122 may be formed in a multiple-layer structure and the remaining portion thereof may be formed of the first transparent conductive layer 101. For example, as illustrated in FIG. 2, a first common electrode 122A positioned between the pixel electrodes 118 of a plurality of common electrodes 122 is formed of the first transparent conductive layer 101 to improve a transmittance, and a second common electrode 122B adjacent to the data line 104 is formed in a multiple-layer structure like the common line 120 to prevent a light leakage.

A plurality of pixel electrode 118 is formed in parallel to the plurality of common electrodes 122 within the pixel area. The pixel electrodes 118 are connected via a first contact hole 126 to a pixel connecting line 118a, which is connected, to the drain electrode 112. The pixel electrode 118 and the pixel connecting line may be formed of the first transparent conductive layer 101. On the other hand, the pixel electrode 118 may be formed in a multiple-layer structure like the common line 120. If a video signal is applied, via the thin film transistor, to the pixel electrode 118, then a horizontal electric field is formed between the pixel electrode 118 and the common electrode 122 supplied with the common voltage. Liquid crystal molecules arranged in the horizontal direction between the thin film transistor array substrate and the color filter array substrate are rotated in response to such horizontal electric field due to a dielectric anisotropy. The amount of light passing through the pixel area is differentiated depending upon the extent of rotation of the liquid crystal molecules, thereby implementing a gray level scale.

As illustrated in FIG. 2, such common electrode 122 and pixel electrode 118 can be formed in a zigzag manner along with the data line 104, or in a linear manner or a stripe manner, as well as other suitable configurations. The common electrode 122 and the pixel electrode 118 may be formed in a zigzag manner, and the data line 104 may be formed in a linear manner or a stripe manner.

A storage capacitor Cst may include a first storage capacitor Cst1 and second storage capacitor Cst2 connected in parallel with the pixel electrode 118. The first storage capacitor Cst1 is provided such that the common electrode 120 overlaps with the pixel connecting line 118a with the gate insulating film 154 therebetween. The pixel connecting line 118a overlapped with the common line 120 extends in such a manner to be overlapped with the pixel electrode 118 and is connected, via the first contact hole 126 passing through the gate insulating film 154, to the pixel electrode 118. The second storage capacitor Cst2 is provided such that a pre-stage gate line 102 overlaps with an upper storage electrode 130 with the gate insulating film 154 therebetween. The upper storage electrode 130 overlapped with the pre-stage gate line 102 exceeds in such a manner to be overlapped with the pixel electrode 118 and is connected, via the second contact hole 134 passing through the gate insulating film 154, to the pixel electrode 118. Thus, a capacitance value of the storage capacitor Cst is increased by a multiple connection of such first and second storage capacitor Cst1 and Cst2, so that the storage capacitor Cst allows a video signal charged in the pixel electrode 118 to be stably maintained until the next signal is charged.

The gate line 102 is connected, via the gate pad 124, to the gate driver (not shown). The gate pad 124 extends from the first transparent conductive layer 101 of the gate line 102 and is exposed through a third contact hole 128 passing through the gate insulating film 154.

The data line 104 is connected, via the data pad 132, to a data driver (not shown). The gate pad 132 has the same structure as the gate pad 132. In other words, the data pad 132 is formed from a transparent conductive layer on the substrate 150 and is exposed through a fourth contact hole 136 passing through the gate insulating film 154. Such data pad 132 is connected, via a fifth contact hole 138 passing through the gate insulating film 154, to the data line 104.

A common pad (not shown) supplies a common voltage from a common voltage source to the common line 120 and has the same structure as the gate pad 124.

A protective film does not need to be formed on the thin film transistor of the present invention. The data line 104 is protected by an alignment film (not shown) to be formed thereon along with the thin film transistor TFT and the upper storage electrode 130. Specially, the active layer 114 exposed between the source electrode 110 and the drain electrode 112 is more protected by a surface layer oxidized into $SiO_2$ through a plasma surface process, so that a reliability of a channel can be kept without the protective film. Also, device characteristic stability is protected by not adjusting a mask process such as an exposing process upon exposing of the active layer 114.

The thin film transistor substrate of horizontal electric field applying type according to the first embodiment of the present invention having no protective film as described above is formed by the following three-round mask process.

Figure 4A:
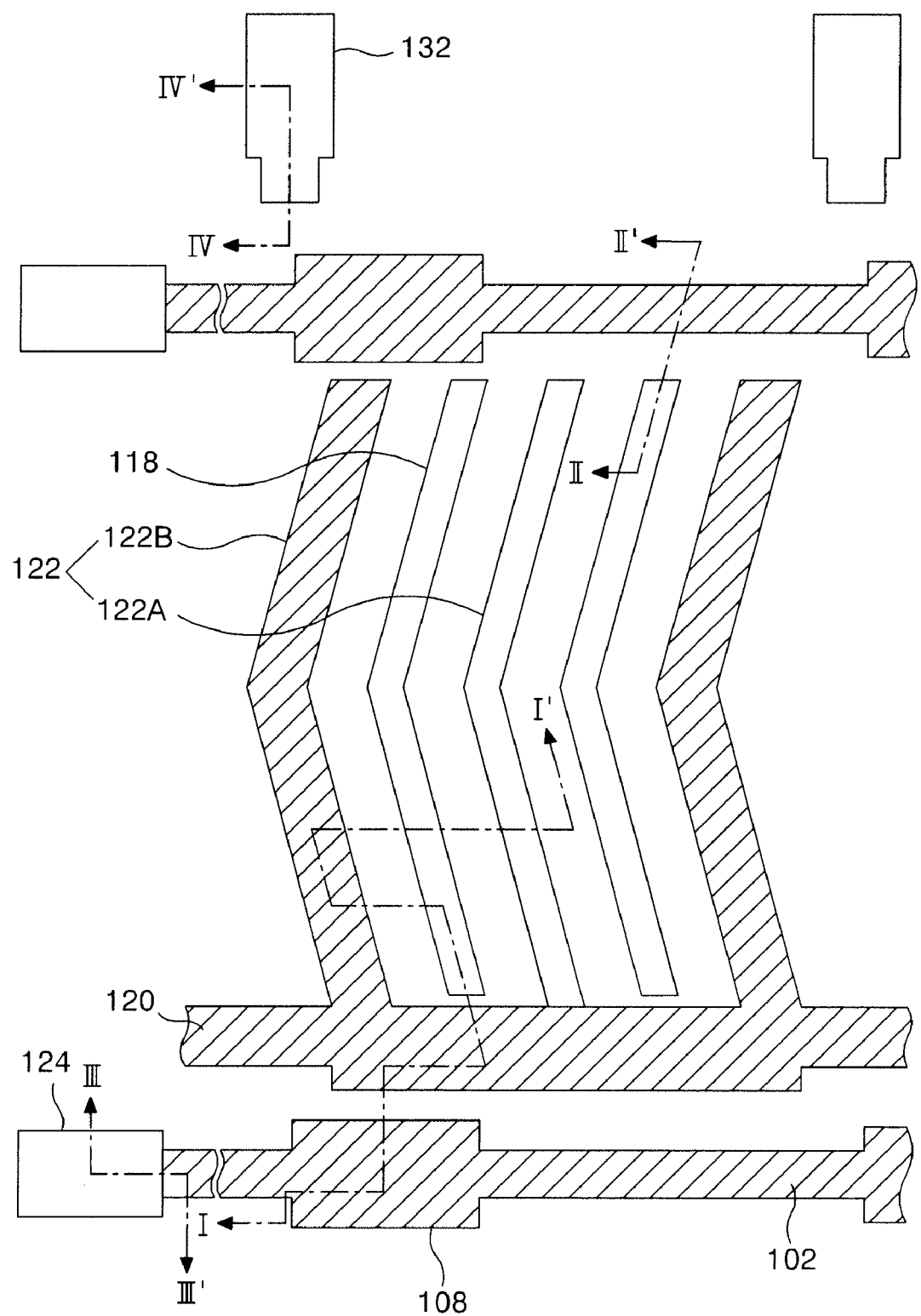
FIG. 4A and FIG. 4B are a plan view and a sectional view for explaining a first mask process in a method of fabricating the thin film transistor substrate according to the first embodiment of the present invention, respectively.
Figure 4B:
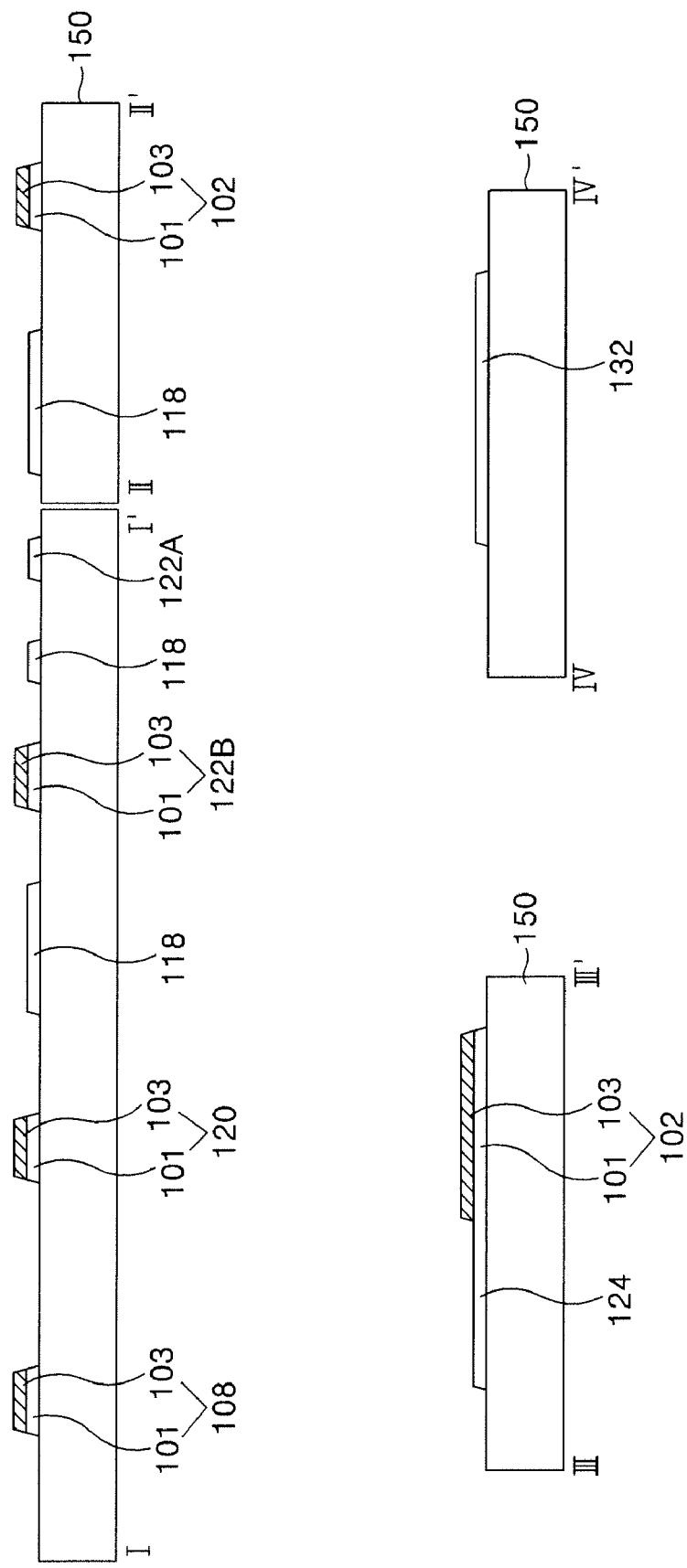

FIG. 4A and FIG. 4B are a plan view and a sectional view for explaining a first mask process, respectively, in a method of fabricating the thin film transistor substrate of horizontal electric field applying type according to the embodiment of the present invention. FIG. 5A to FIG. 5D are sectional views for specifically explaining the first mask process according to the first embodiment of the present invention.

A first mask pattern group including the gate line 102, the gate electrode 108, the common line 120, the common electrode 122, the pixel electrode 118, the gate pad 124 and the data pad 132 is formed on the lower substrate 150 by the first mask process. The gate line 102, the gate electrode 108, the common line 120 and the second common electrode 122B have a multiple-layer structure in which at least two conductive layers are built. But for explanation convenience sake, only a double-layer structure having the first and second conductive layers 101 and 103 will be described. The first common electrode 122A, the pixel electrode 118, the gate pad 124 and the data pad 132 are formed of the first transparent conductive layer 101. Such first mask pattern group having a multiple-layer structure and a single-layer structures may be provided by a single of mask process employing a diffractive exposure mask or a half tone mask. Hereinafter, an example using the half tone mask as a first mask will be described.

Referring to FIG. 5A, the first and second conductive layers 101 and 103 are formed on the lower substrate 150 by a deposition technique such as the sputtering, etc.

The first conductive layer 101 is formed of a transparent conductive material such as ITO, TO, IZO or ITZO, etc. On the other hand, the second conductive layer 103 employs a single layer formed of a metal material or uses a layer structure of at least double layers including at least two of Mo, Ti, Cu, AlNd, Al, Cr, a Mo-alloy, a Cu-alloy, an Al-alloy, or the like, etc.

A different thickness of first photo-resist pattern 160 is formed on the second conductive layer 103 by a photolithography process using a half tone mask.

The half tone mask includes a shielding part for blocking ultraviolet light, a half-tone transmitting part for partially transmitting the ultraviolet light using a phase-shifting material, and a full transmitting part for fully transmitting the ultraviolet light. The first photo-resist pattern 160 includes at least two different thicknesses of first photo-resist patterns 160A and 160B and an aperture part by the photolithography using a half tone mask. In this case, the thickness of the two first photo-resist patterns 160A is provided at a shielding area P1 of the first photo-resist overlapping with the shielding part of the half tone mask, the thinner of the two first photo-resist patterns 160B is provided at a half tone exposure area P2 overlapping with the half-tone transmitting part, and the aperture part is provided at an full exposure area P3 overlapping with the full transmitting part.

Referring to FIG. 5B, the first and second conductive layers 101 and 103 are etched by an etching process using the first photo-resist pattern 160 as a mask, thereby providing the first mask pattern group including a multiple-layer structure of the gate line 102, the gate electrode 108, the common line 120, the common electrode 122, the pixel electrode 118, the gate pad 124 and the data pad 132.

Referring to FIG. 5C, a thickness of the first photo-resist pattern 160A is thinned while the first photo-resist pattern 160B is removed by an ashing process. And, the second conductive layer 103 of the first common electrode 122A, the pixel electrode 118, the gate pad 124 and the data pad 132 are removed by the etching process using the ashed first photo-resist pattern 160A as a mask.

Referring to FIG. 5D, the first photo-resist pattern 160A left on the first mask pattern group in FIG. 5C is removed by the stripping process.

Figure 6A:
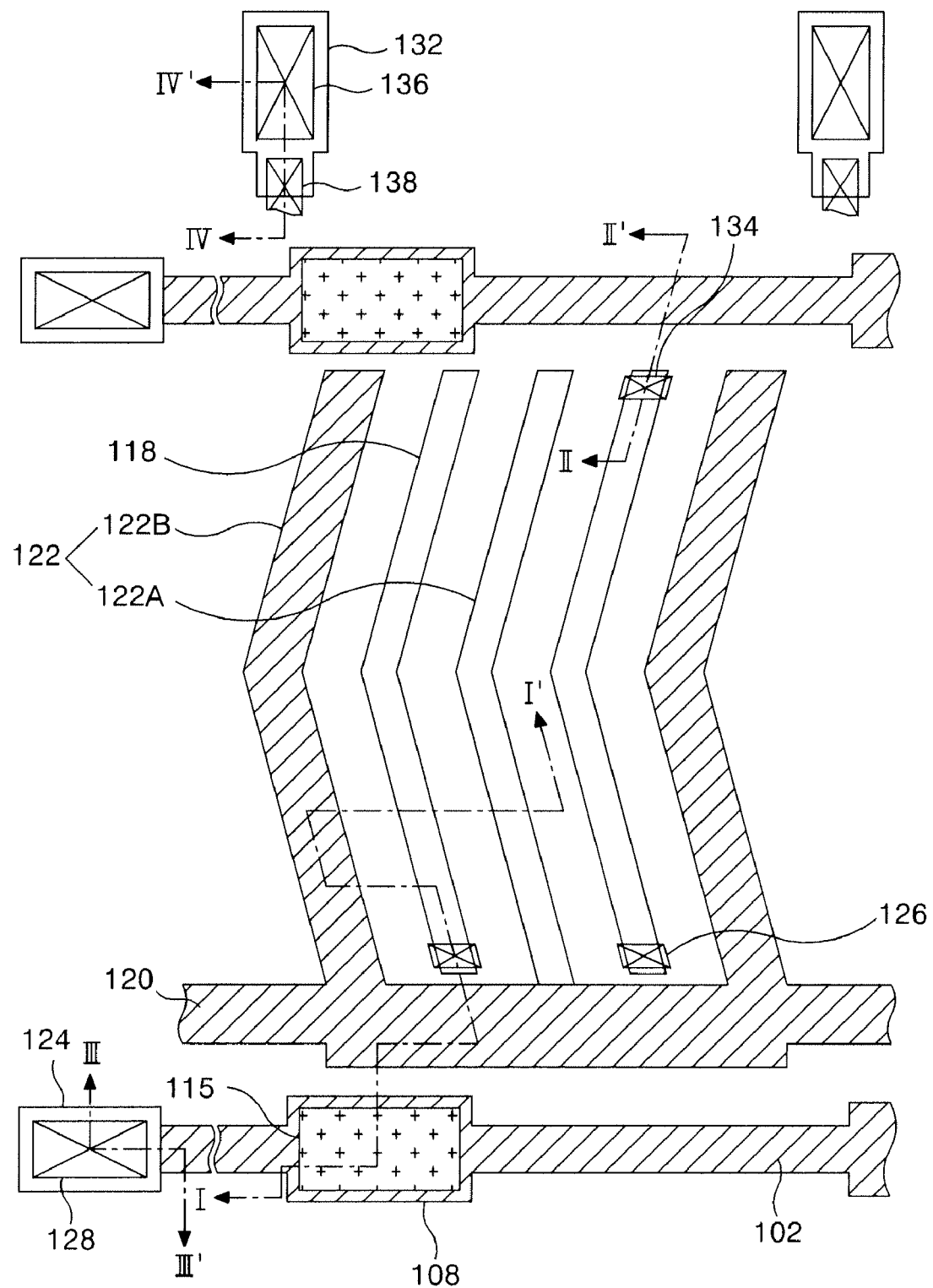
FIG. 6A and FIG. 6B are a plan view and a sectional view for explaining a second mask process in a method of fabricating the thin film transistor substrate according to the first embodiment of the present invention, respectively.
Figure 6B:
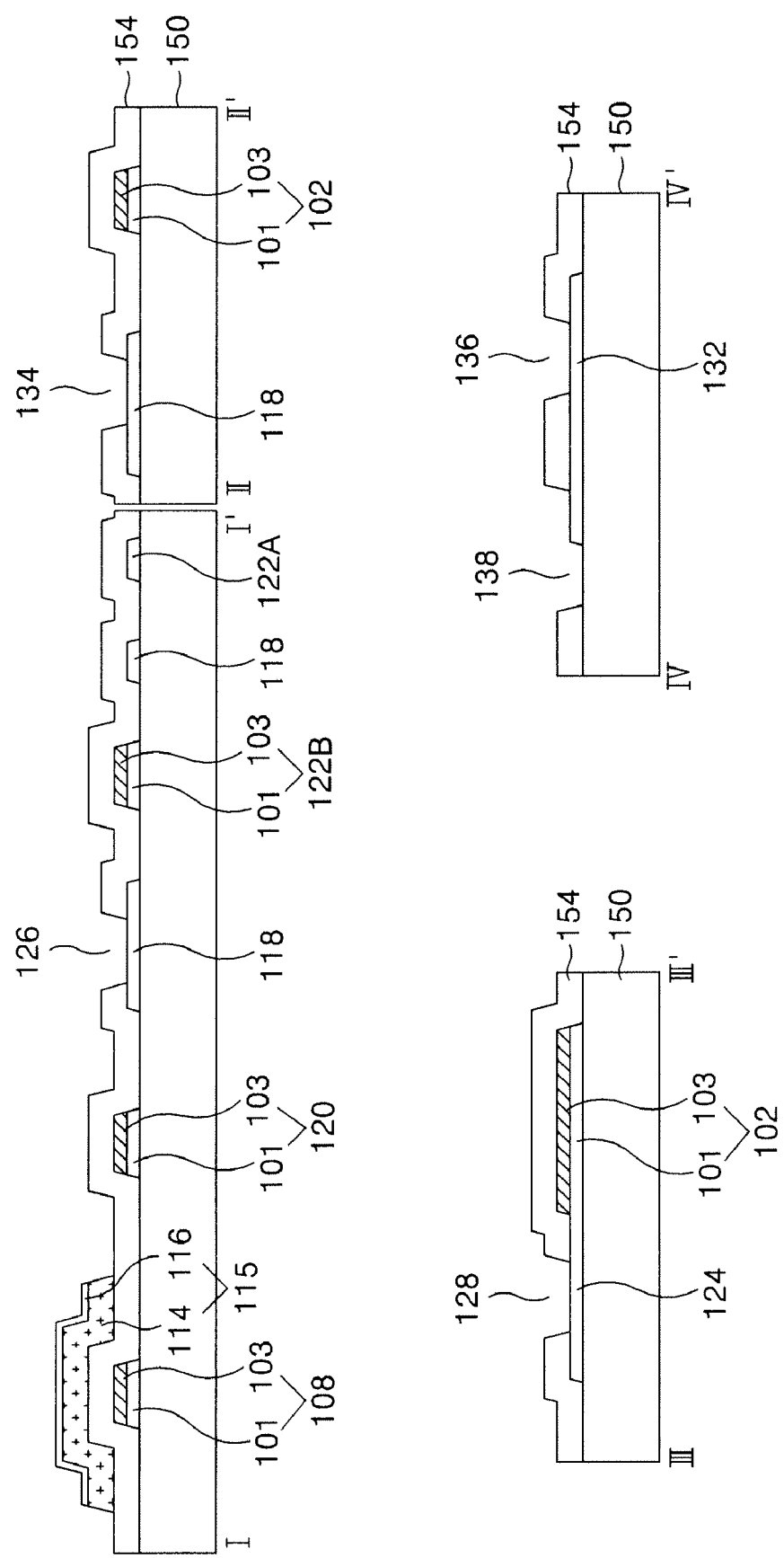

FIG. 6A and FIG. 6B are a plan view and a sectional view for explaining a second mask process, respectively, in a method of fabricating the thin film transistor substrate of horizontal electric field applying type according to the embodiment of the present invention. FIG. 7A to FIG. 7D are sectional views for specifically explaining the second mask process according to the first embodiment of the present invention.

The gate insulating film 154 including a plurality of contact holes 126, 134, 128, 136 and 138 and the semiconductor pattern 115 are formed on the lower substrate 150 provided with the first mask pattern group by the second mask process. The semiconductor pattern 115, and the contact holes 126, 134, 128, 136 and 138 are defined by a single mask process employing a diffractive exposure mask or a half tone mask. Hereinafter, an example in which the half tone mask is used as a second mask will be described.

Figure 7A:
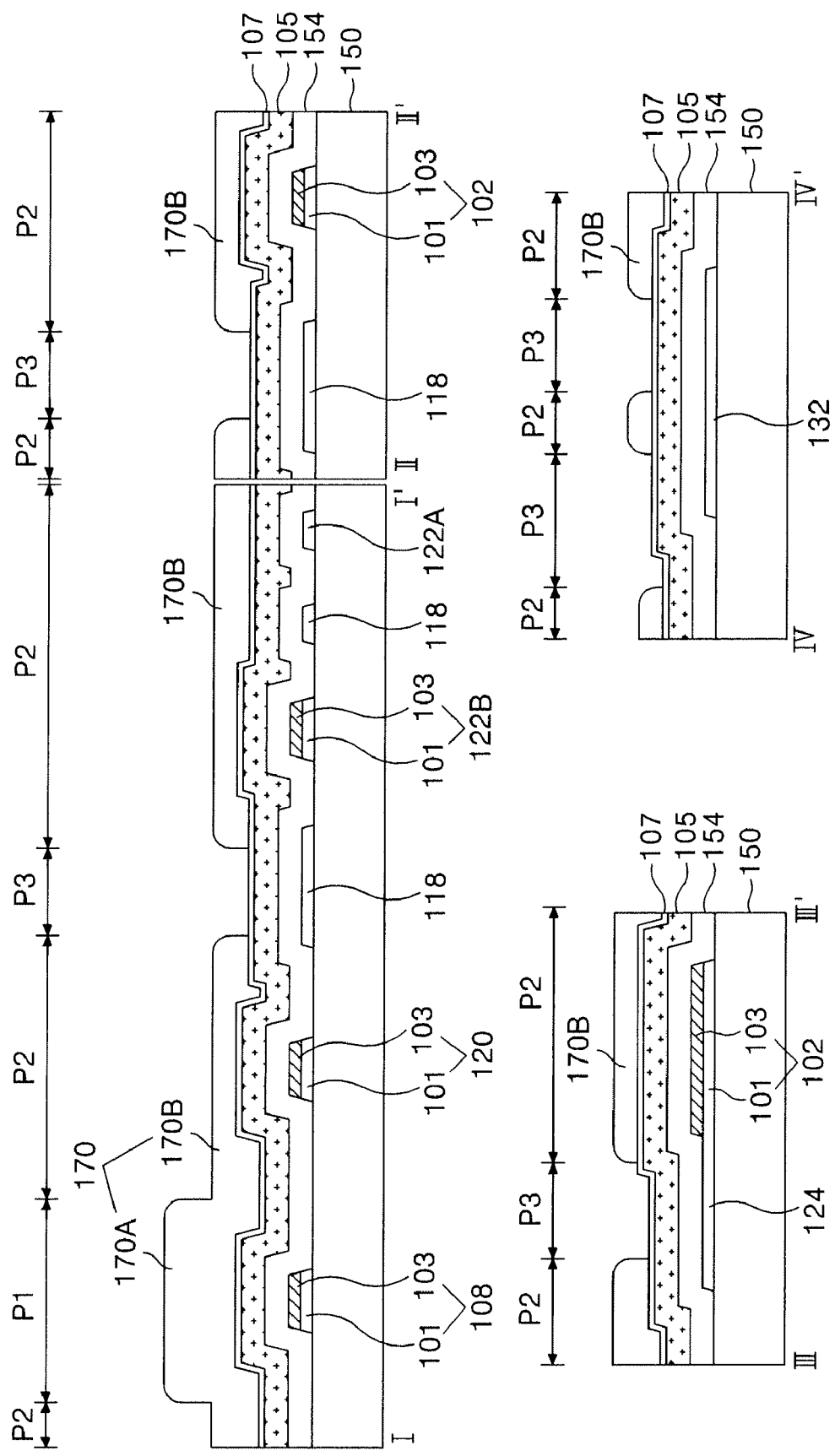

Referring to FIG. 7A, the gate insulating film 154, an amorphous silicon layer 105 and an amorphous silicon layer 107 doped with an n⁺ or p⁺ impurity are substantially sequentially disposed on the lower substrate 150 provided with the first mask pattern group by a deposition technique such as the PECVD, etc. Herein, the gate insulating film 154 is formed of an inorganic insulating material such as silicon oxide ($SiO_x$) or silicon nitride ($SiN_x$).

A different thickness of second photo-resist pattern 170 is formed by the photolithography process using a half tone mask. The second photo-resist pattern 170 includes different thicknesses of second photo-resist patterns 170A and 170B and an aperture part. In this case, the thicker of second photo-resist patterns 170A is provided at a shielding area P1 overlapping with the shielding part of the half tone mask, the thinner of second photo-resist patterns 170B is provided at a half tone exposure area P2 overlapping with the half-tone transmitting part, and the aperture part is provided at an full exposure area P3 overlapping with the full transmitting part.

Referring to FIG. 7B, the first to fifth contact holes 126, 134, 128, 136 and 138 passing through the gate insulating film 154 from the amorphous silicon layer 107 are formed by the etching process using the second photo-resist pattern 170 as a mask. The first and second contact holes 126 and 134 expose the pixel electrode 118, the third contact hole 126 exposes the gate pad 124, and the fourth and fifth contact holes 136 and 138 expose the data pad 132.

Referring to FIG. 7C, a thickness of the second photo-resist pattern 170A is thinned while the second photo-resist pattern 170B is removed by the ashing process. The amorphous silicon layer 107 and the amorphous silicon layer 105 are patterned by the etching process using the ashed second photo-resist pattern 170A as a mask to thereby provide the semiconductor pattern 115 including the active layer 114 and the ohmic contact layer 116.

Referring to FIG. 7D, the second photo-resist pattern 170A remaining on the semiconductor pattern 115 in FIG. 7C is removed by the stripping process.

Figure 8A:
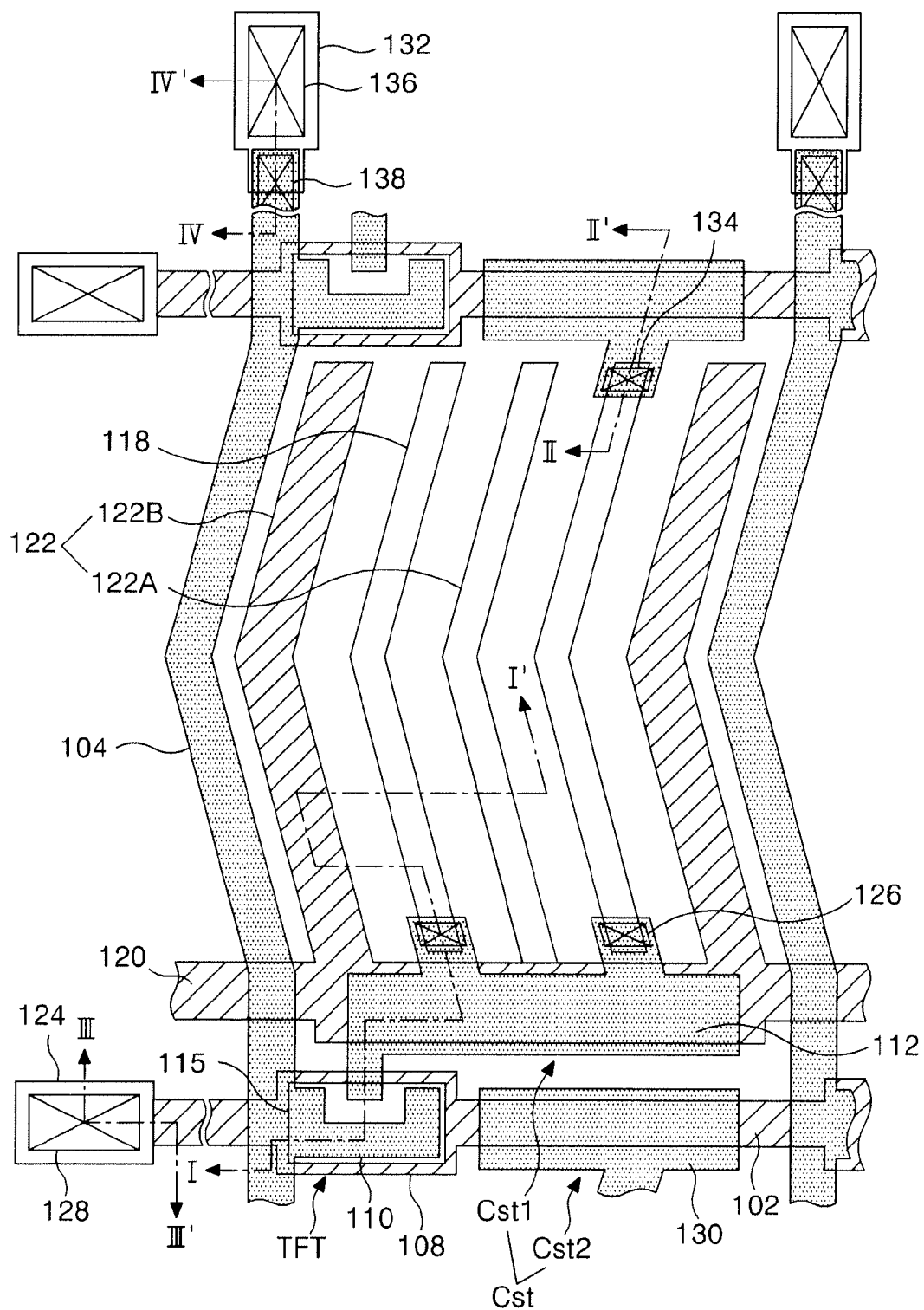
FIG. 8A and FIG. 8B are a plan view and a sectional view for explaining a third mask process in a method of fabricating the thin film transistor substrate according to the first embodiment of the present invention, respectively.
Figure 8B:
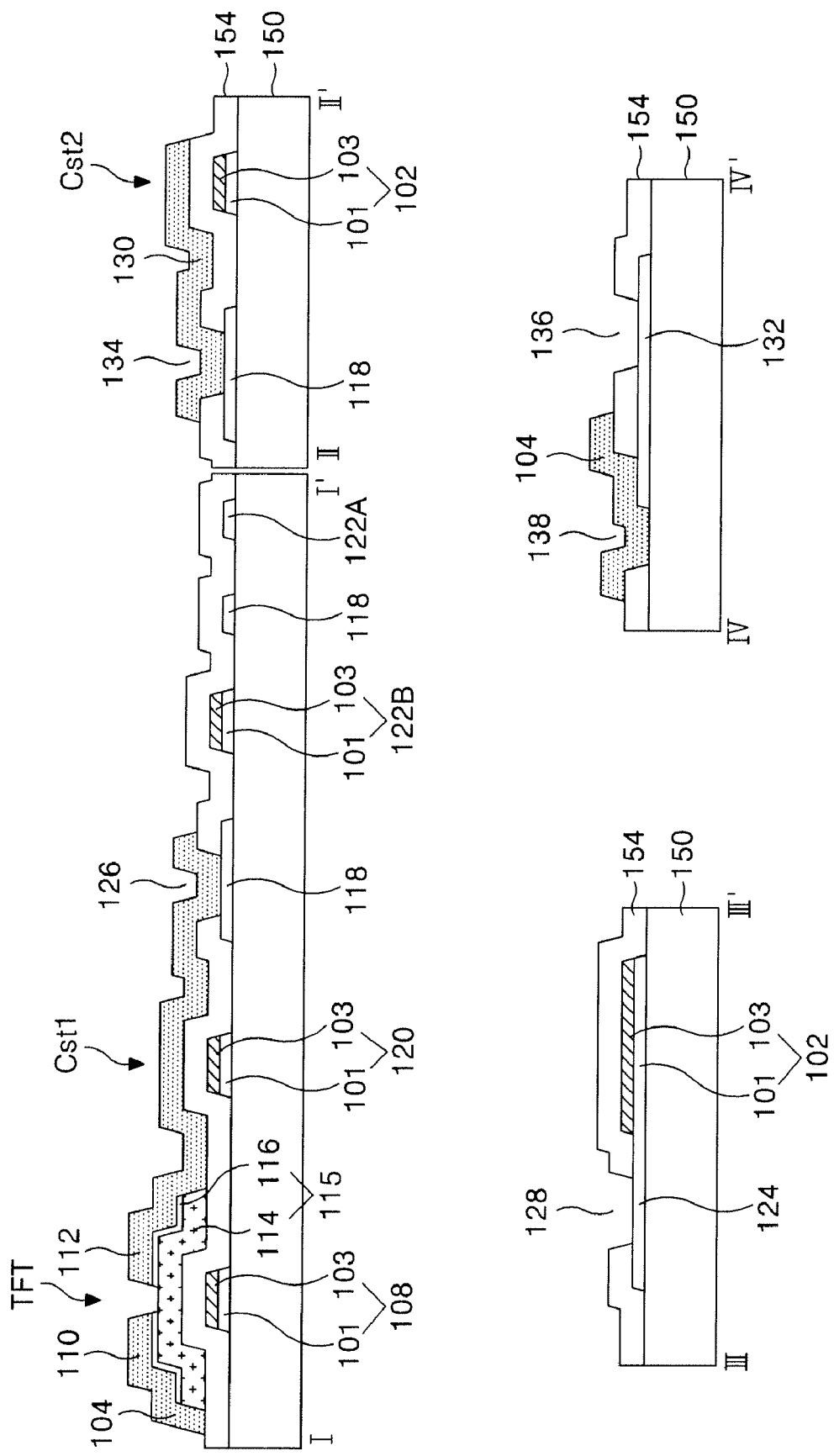

FIG. 8A and FIG. 8B are a plan view and a sectional view respectively for explaining a third mask process in a method of fabricating the thin film transistor substrate according to the embodiment of the present invention.

A third mask pattern group including the data line 104, the source electrode 110, the drain electrode 112, the pixel connecting line 118a the upper storage electrode 130 is formed on the gate insulating film 154 by the third mask process, and the active layer 114 oxidized a surface thereof between the source electrode 110 and the drain electrode 112 is exposed.

The third conductive layer is formed on the gate insulating film 154 provided with the semiconductor pattern 115 by a deposition technique such as sputtering, etc. The third conductive layer employs a single layer formed of a metal material or has multiple layers structure of at least double layers such as Mo, Ti, Cu, AlNd, Al, Cr, a Mo-alloy, a Cu-alloy or an Al-alloy, etc. The third conductive layer is patterned by the photolithography process and the etching process to thereby provide the third mask pattern group including the data line 104, the source electrode 110, the drain electrode 112, the pixel connecting line 118a and the upper storage electrode 130. The data line 104 is connected, via the fifth contact hole 138, to the data pad 132. The pixel connecting line 118a is connected, via the first contact hole 126, to the pixel electrode 118. The upper storage electrode 130 is connected, via the second contact hole 134, to the pixel electrode 118.

Furthermore, with the photoresist pattern remaining in the third mask pattern group, the ohmic contact layer 116 between the source electrode 110 and the drain electrode 112 is removed, thereby allowing the active layer 114 to be exposed. Thus, an exposing process is not adjusted in the active layer 114, thereby providing more stable device characteristics.

A surface of the exposed active layer 114 is oxidized into $SiO_2$ by a surface process using oxygen ($O_2$) plasma, so that the reliability of the channel can be maintained without the protective film.

Accordingly, the method of fabricating the thin film transistor substrate of horizontal electric field applying type according to the first embodiment of the present invention can be simplified by the three-round mask process.

Figure 9:
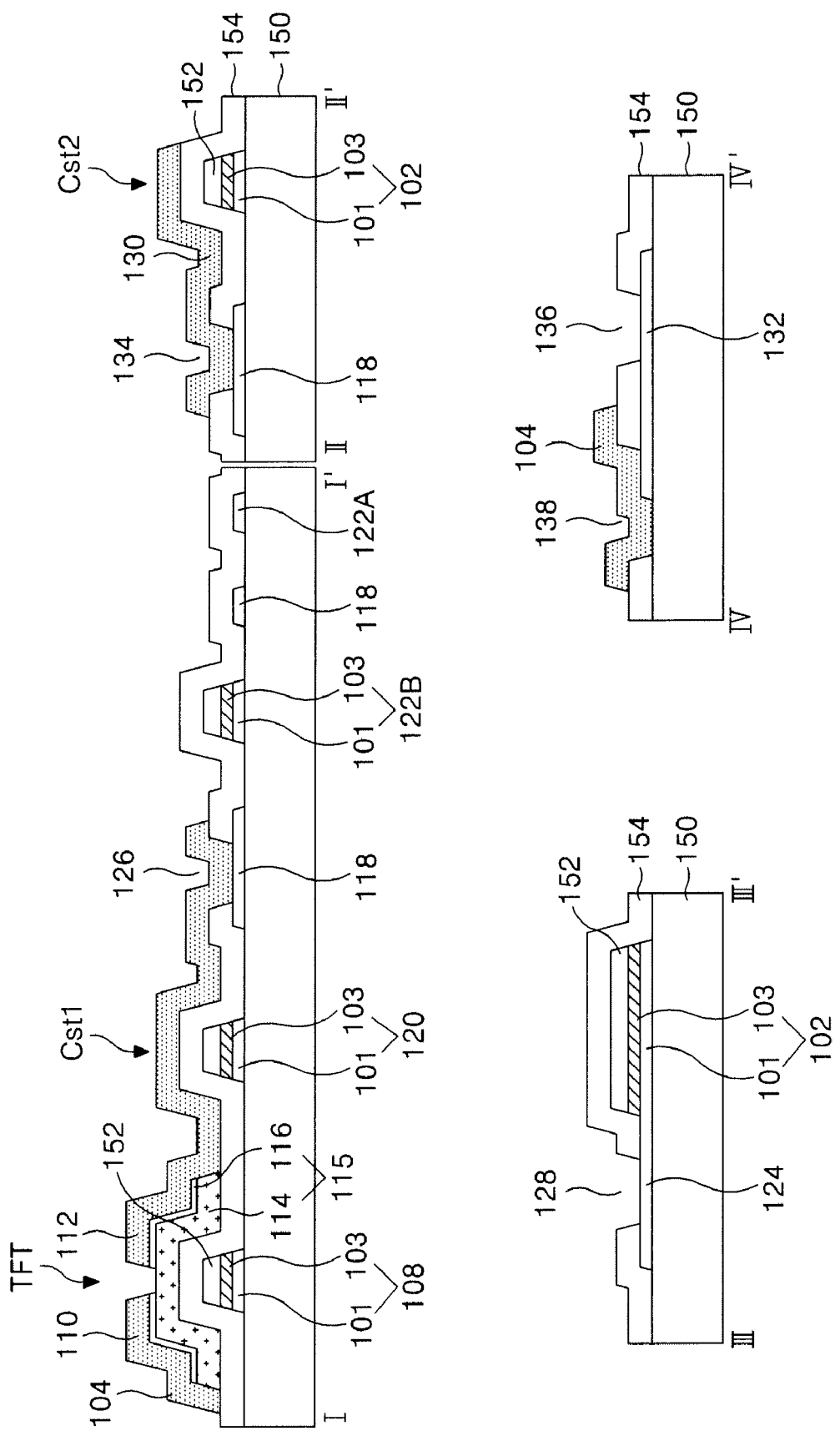
FIG. 9 is a sectional view showing a portion of a thin film transistor substrate of a liquid crystal display device according to a second embodiment of the present invention.

FIG. 9 is a sectional view illustrating a thin film transistor substrate of horizontal electric field applying type according to a second embodiment of the present invention, and a plan view is the same as illustrated FIG. 2.

The thin film transistor substrate according to the second embodiment of the present invention illustrated in FIG. 9 has the same elements as the thin film transistor substrate according to the first embodiment of the present invention illustrated in FIG. 3 except that a second gate insulating film 152 is formed in a pattern having a multiple-layer structure of the first mask pattern group, that is, between the second conductive layer 103 and the gate insulating film 154. Therefore, an explanation as to the same elements will be omitted.

Referring to FIG. 9, the second gate insulating film 152 is formed on a multiple-layer conductive layer structure of gate line 102, the gate electrode 108, the common line 120 and the second common electrode 122B. The distance between the gate line 102 and the data line 104 is greater because of the second gate insulating film 152, so that signal interference between the gate line 102 and the dataline 104 can be minimized. Such second gate insulating film 152 is formed by a first mask process along with the first mask pattern group.

FIG. 10A to FIG. 10D are sectional views for specifically explaining a first mask process in a method of fabricating the thin film transistor substrate illustrated in FIG. 9.

A first mask pattern group including the gate line 102, the gate electrode 108, the common line 120, the common electrode 122, the pixel electrode 118, the gate pad 124 and the data pad 132 is formed on the lower substrate 150 by the first mask process, and the second gate insulating film 152 is formed in a pattern having a multiple-layer structure. For example, the second gate insulating film 152 is formed on the gate line 102, the gate electrode 108, the common line 120 and the second common electrode 122B having a multiple-layer structure in which the first and second conductive layers 101 and 103 are built. Such second gate insulating film 152 and the first mask pattern group having multiple-layer and single-layer structures are formed by a single mask process employing a half tone mask or a diffractive exposure mask. Hereinafter, an example in which the half tone mask is used as a first mask will be described.

Figure 10A:
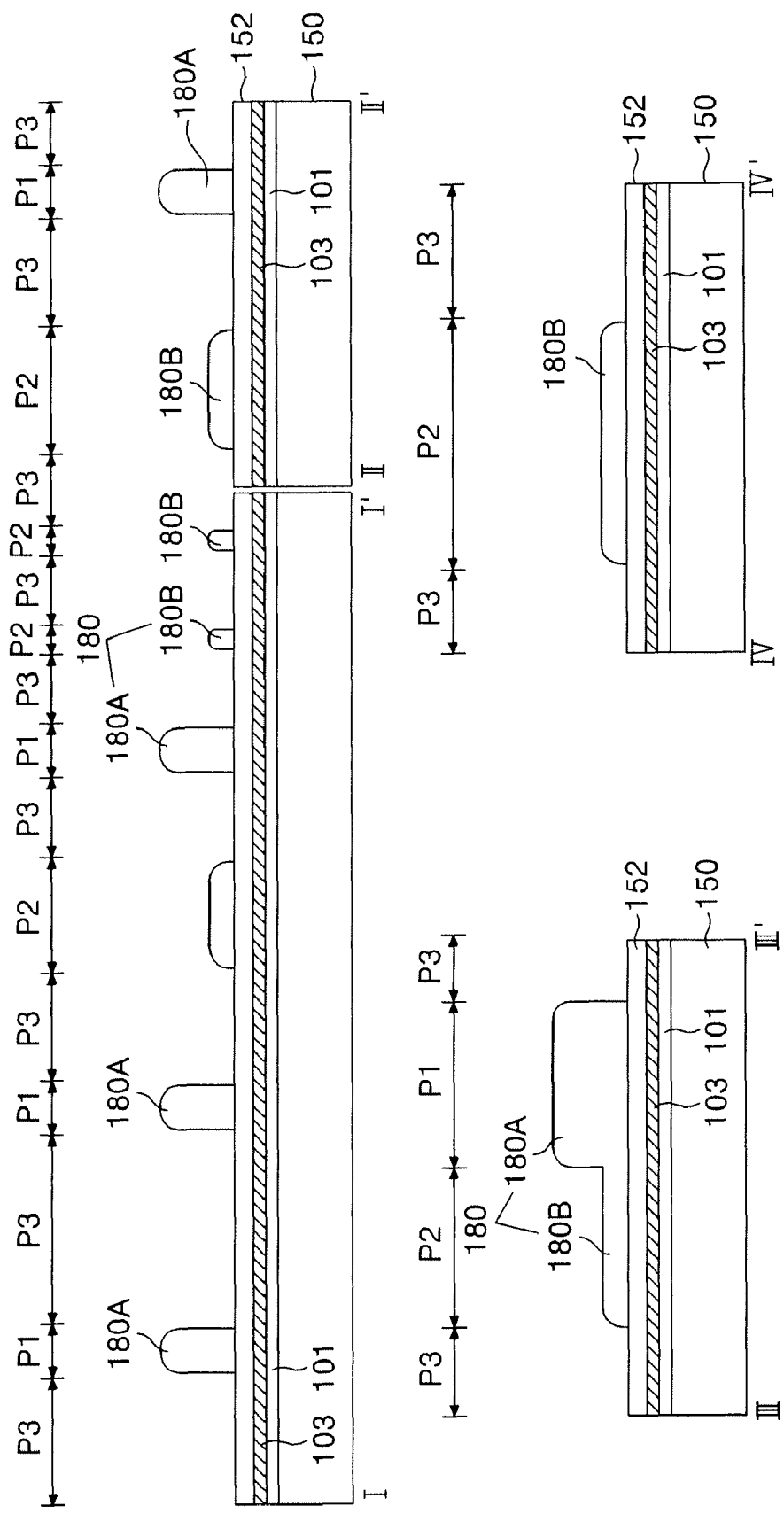

Referring to FIG. 10A, the first and second conductive layers 101 and 103 are disposed on the lower substrate 150, and the second gate insulating film 152 is formed on the second conductive layer 103 by a deposition technique such as sputtering, etc.

The first conductive layer 101 is formed of a transparent conductive material such as ITO, TO, IZO or ITZO, etc. On the other hand, the second conductive layer 103 employs a single layer formed of a metal material or includes a multiple layer structure of at least double layers such as Mo, Ti, Cu, AlNd, Al, Cr, a Mo-alloy, a Cu-alloy or an Al-alloy, etc. The second gate insulating film 152 is formed of an inorganic insulating film such as the above-mentioned gate insulating film 154.

Moreover, a different thickness of first photo-resist pattern 180 is formed on the second gate insulating film 152 by a photolithography process using a half tone mask. The first photo-resist pattern 180 includes a different thicknesses of first photo-resist patterns 180A and 180B and an aperture part. In this case, the thicker of the first photo-resist patterns 180A is provided at a shielding area P1 of the first photo-resist overlapping with the shielding part of the half tone mask, the thinner of the first photo-resist patterns 180B is provided at a half tone exposure area P2 overlapping with the half-tone transmitting part, and the aperture part is provided at an full exposure area P3 overlapping with the full transmitting part.

Referring to FIG. 10B, the second gate insulating film 152 and the first and second conductive layers 101 and 103 are etched by the etching process using the first photo-resist pattern 180 as a mask, thereby providing the first mask pattern group including a multiple-layer structure gate line 102, gate electrode 108, common line 120, common electrode 122, pixel electrode 118, gate pad 124 and data pad 132. The second gate insulating film 152 is left of the first mask pattern group.

Figure 10C:
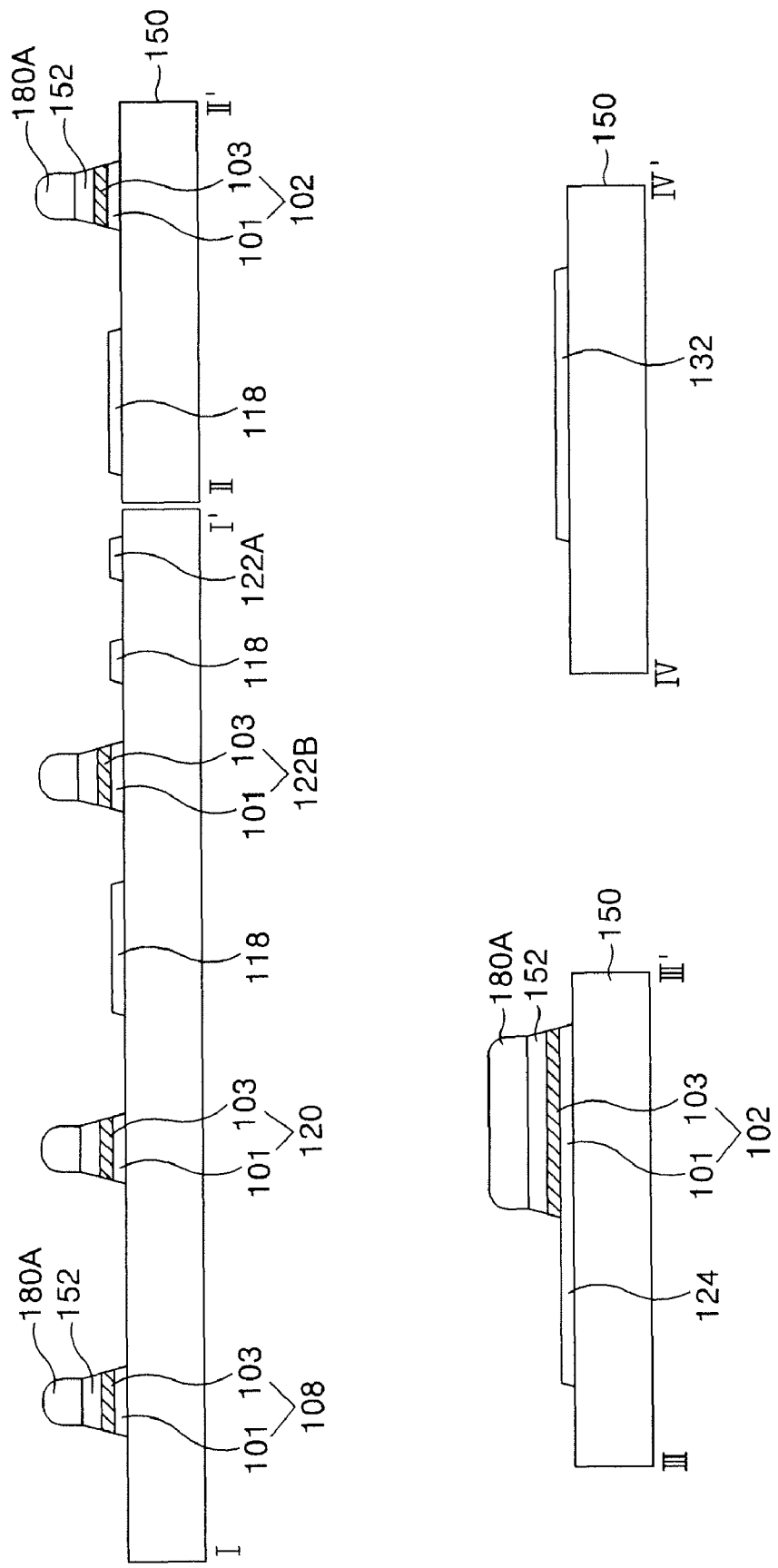

Referring to FIG. 10C, a thickness of the first photo-resist pattern 180A is thinned while the first photo-resist pattern 180B is removed by the ashing process. The first common electrode 122A, the pixel electrode 118, the gate pad 124 and the second conductive layer 103 of the data pad 132 along with the second gate insulating film 152 left thereon are removed by the etching process using the ashed first photo-resist pattern 180A as a mask. Accordingly, the gate line 102, the gate electrode 108, the common line 120 and the second common electrode 122B have a multiple-layer structure in which the first and second conductive layers 101 and 103 are built, and the second gate insulating film 152 is left thereon.

Figure 10D:
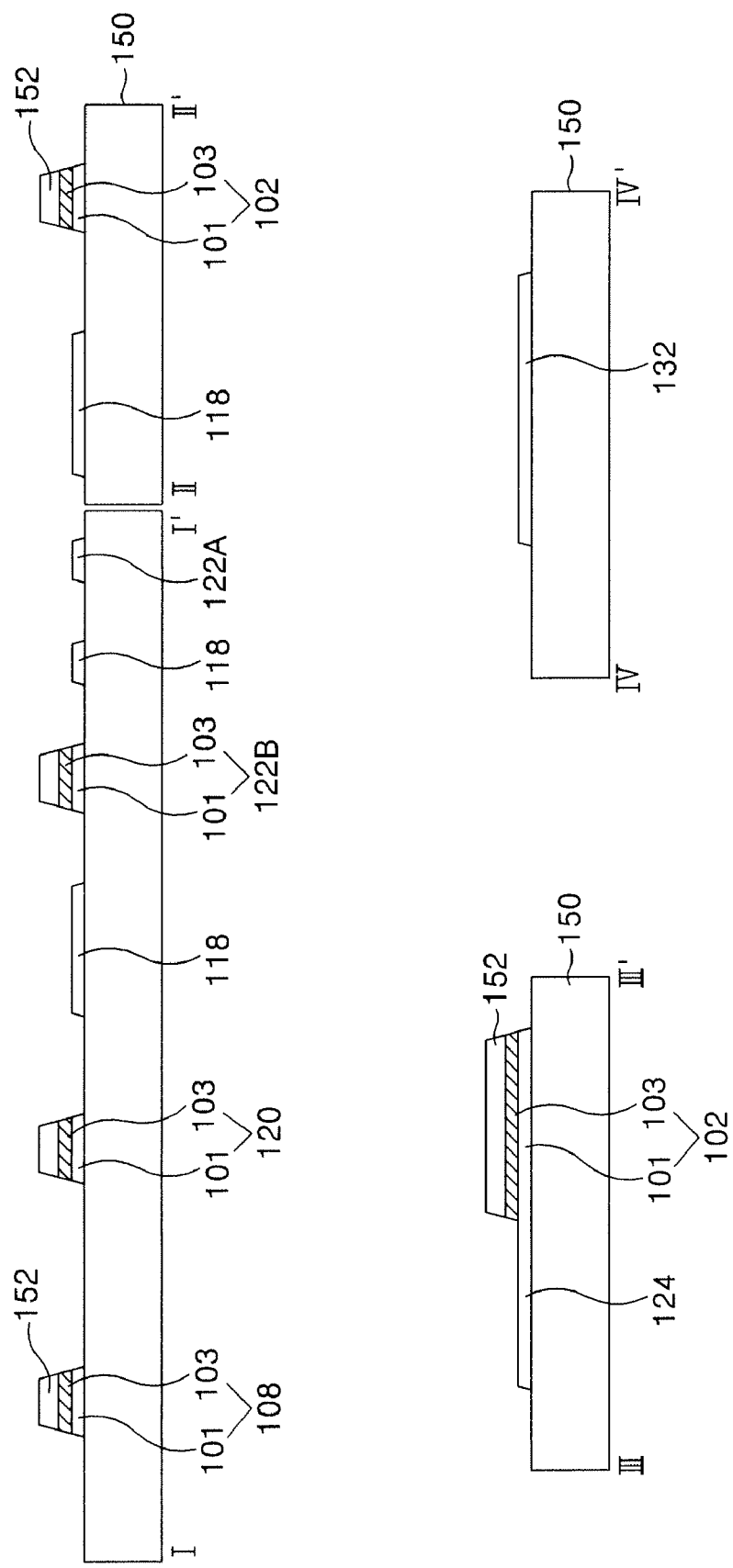

Referring to FIG. 10D, the first photo-resist pattern 180A left on the first mask pattern group in FIG. 10C is removed by the stripping process.

Figure 11:
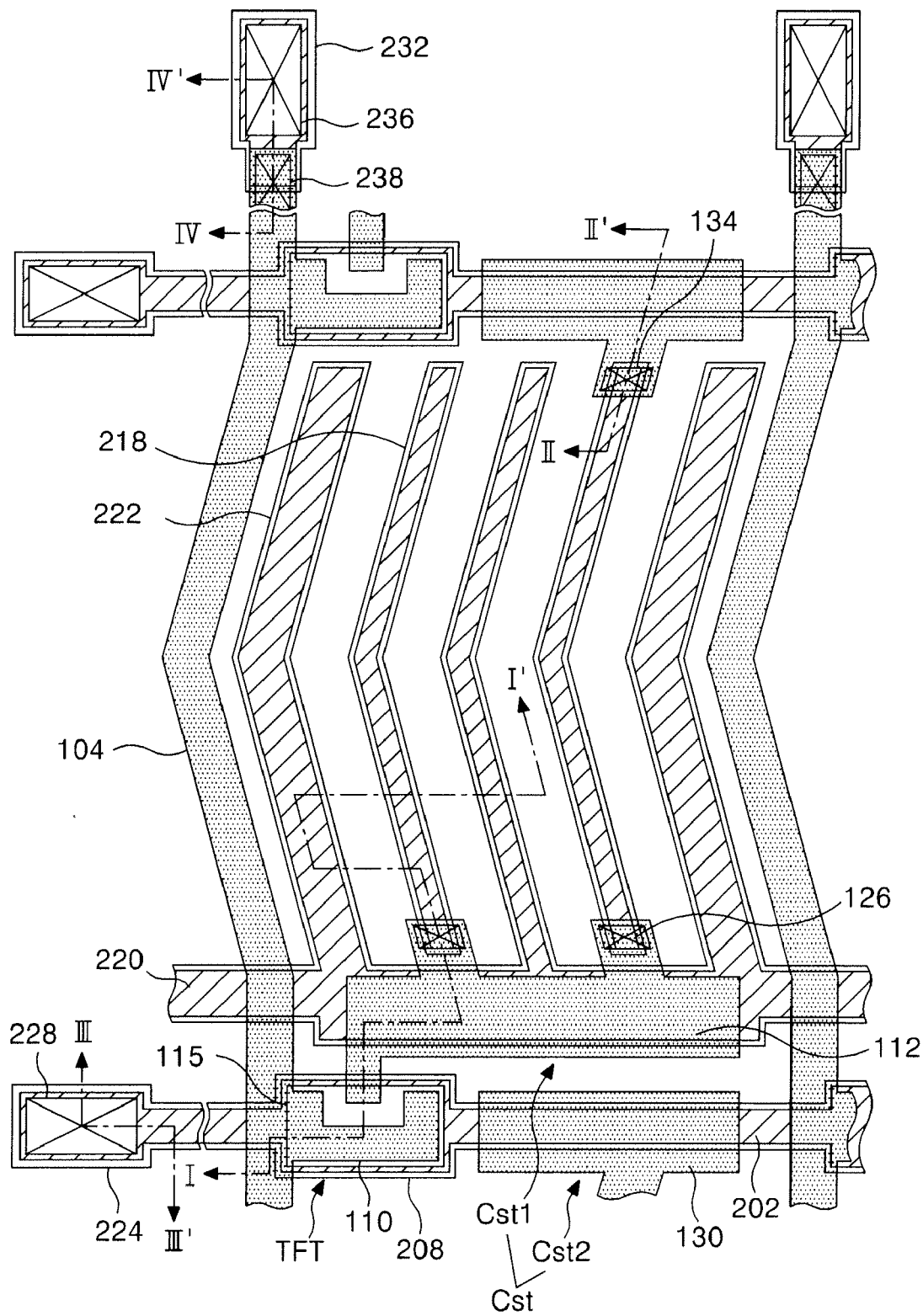
FIG. 11 is a plan view illustrating a portion of a thin film transistor substrate of a liquid crystal display device according to a third embodiment of the present invention.
Figure 12:
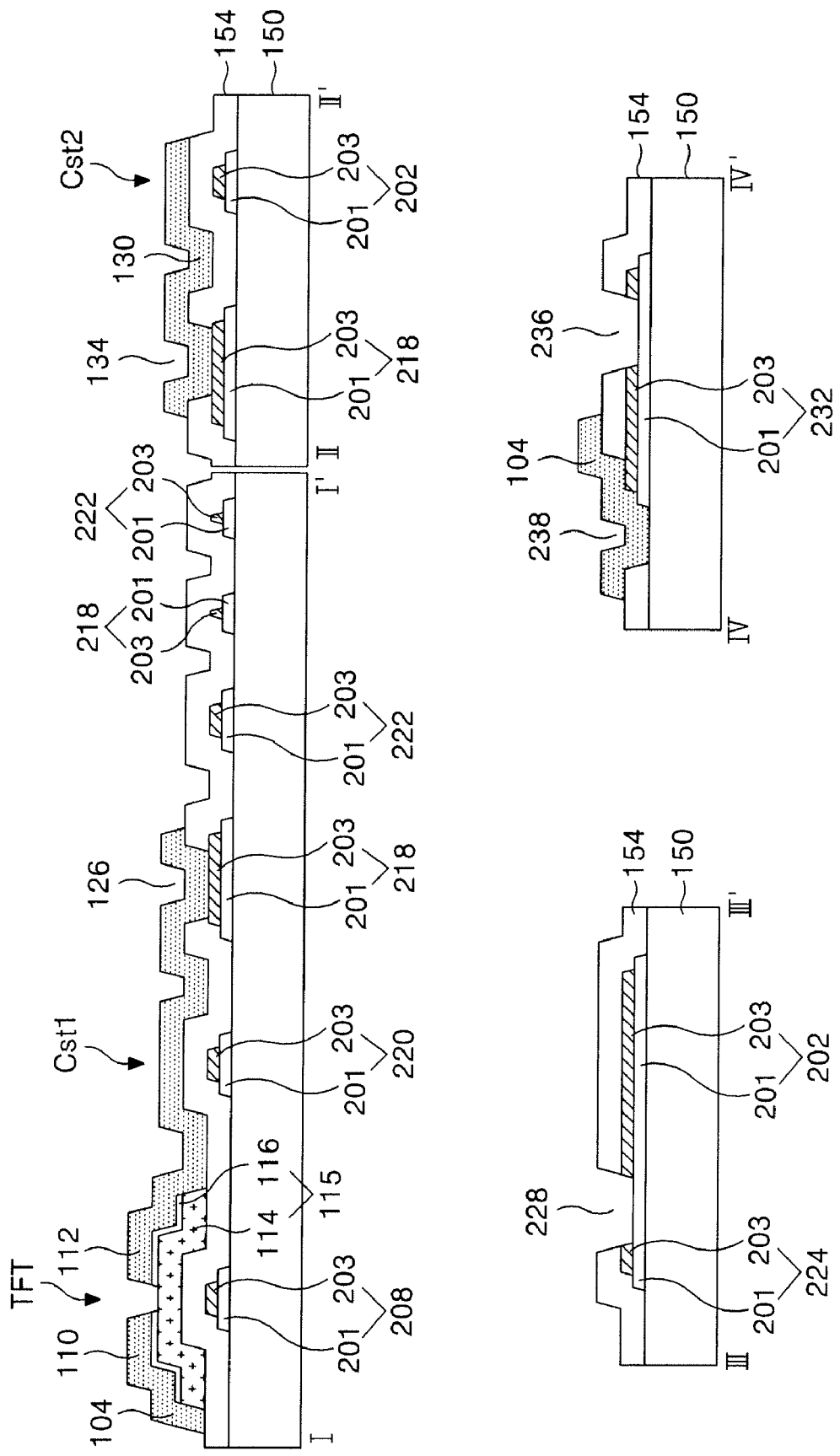
FIG. 12 is a sectional view of the thin film transistor substrate taken along the I-I', II-II', III-III', IV-IV' lines in FIG. 11.

FIG. 11 and FIG. 12 are a plan view and a sectional view respectively illustrating a thin film transistor substrate of a liquid crystal display device of horizontal electric field applying type according to a third embodiment of the present invention.

The thin film transistor substrate according to the third embodiment of the present invention shown in FIG. 11 and FIG. 12 has the same elements as the thin film transistor substrate according to the first embodiment of the present invention illustrated in FIG. 2 and FIG. 3, except that all first mask pattern groups have a multiple-layer structure. Therefore, an explanation as to the same elements will be omitted.

Referring to FIG. 11 and FIG. 12, the first mask pattern group including a gate line 202, a gate electrode 208, a common line 220, a common electrode 222, the pixel electrode 118, a gate pad 224 and a data pad 232 has a multiple-layer structure of at least first and second conductive layers 201 and 203. As described above, the first conductive layer 201 is formed of a transparent conductive layer, and the second conductive layer 203 employs a substantially opaque conductive layer. The second conductive layer 203 employs a single-layer and a double-layer or a triple-layer structure formed of a metal layer.

Specially, the first and second conductive layers 201 and 203 of the first mask pattern group are formed in such a manner to have constant step coverage. In other words, a surface of the first transparent conductive layer 201 is formed is exposed along an edge of a second substantially opaque conductive layer 203. Accordingly, the first conductive layer 201 exposed from the common electrode 222 and the pixel electrode 118 increases a transmittance of a light, so that brightness can be improved. Also, the second conductive layers 203 of the common electrode 222 and the pixel electrode 118 prevent the light leakage, so that a contrast ratio can be improved.

Furthermore, a gate pad 224 and a data pad 232 have a structure in which the first transparent conductive layer 201 is exposed through each third and fourth contact hole 228 and 236, respectively passing through the gate insulating film 154 and the second conductive layer 203.

A method of fabricating the thin film transistor substrate according to the third embodiment of the present invention has the same elements as a method of fabricating the thin film transistor substrate according to the above-mentioned first embodiment of the present invention except for differences in the first and third mask processes. Therefore, an explanation as to the second mask process will be omitted.

Figure 13A:
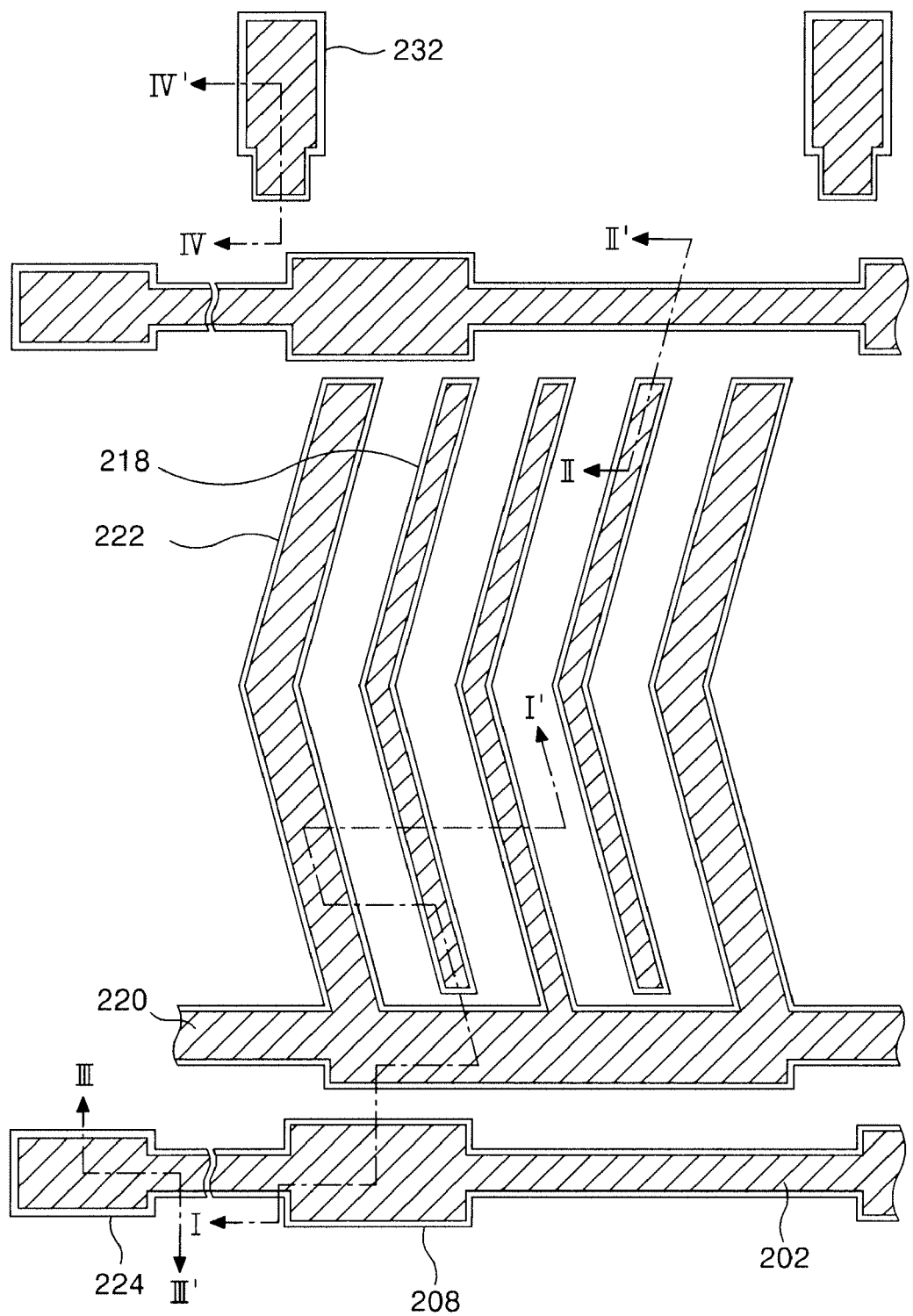
FIG. 13A and FIG. 13B are a plan view and a sectional view for explaining a first mask process in a method of fabricating the thin film transistor substrate according to the third embodiment of the present invention, respectively.
Figure 13B:
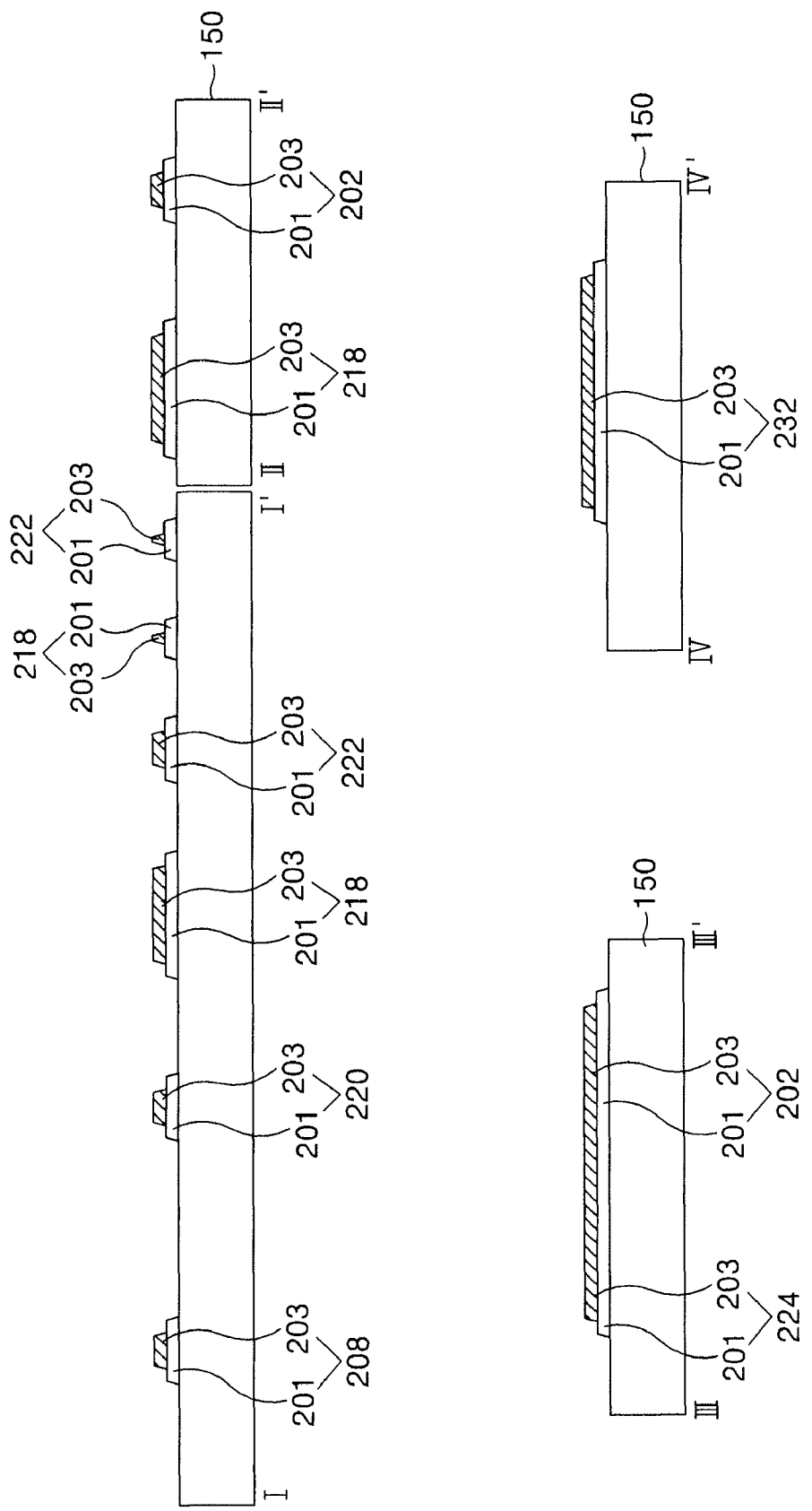
Figure 14A:
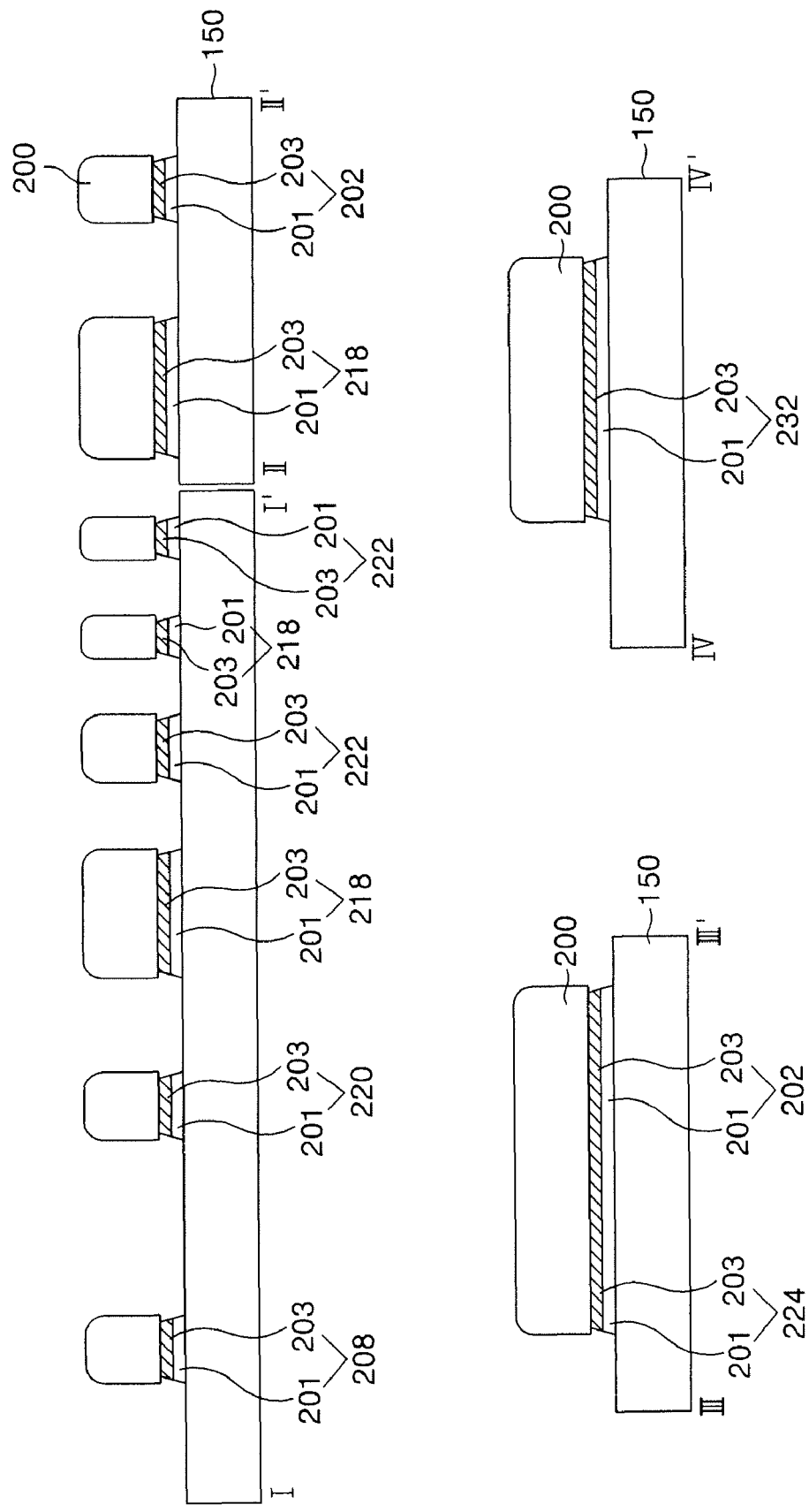
FIG. 14A to FIG. 14C are sectional views for specifically explaining the first mask process according to the third embodiment of the present invention.
Figure 14B:
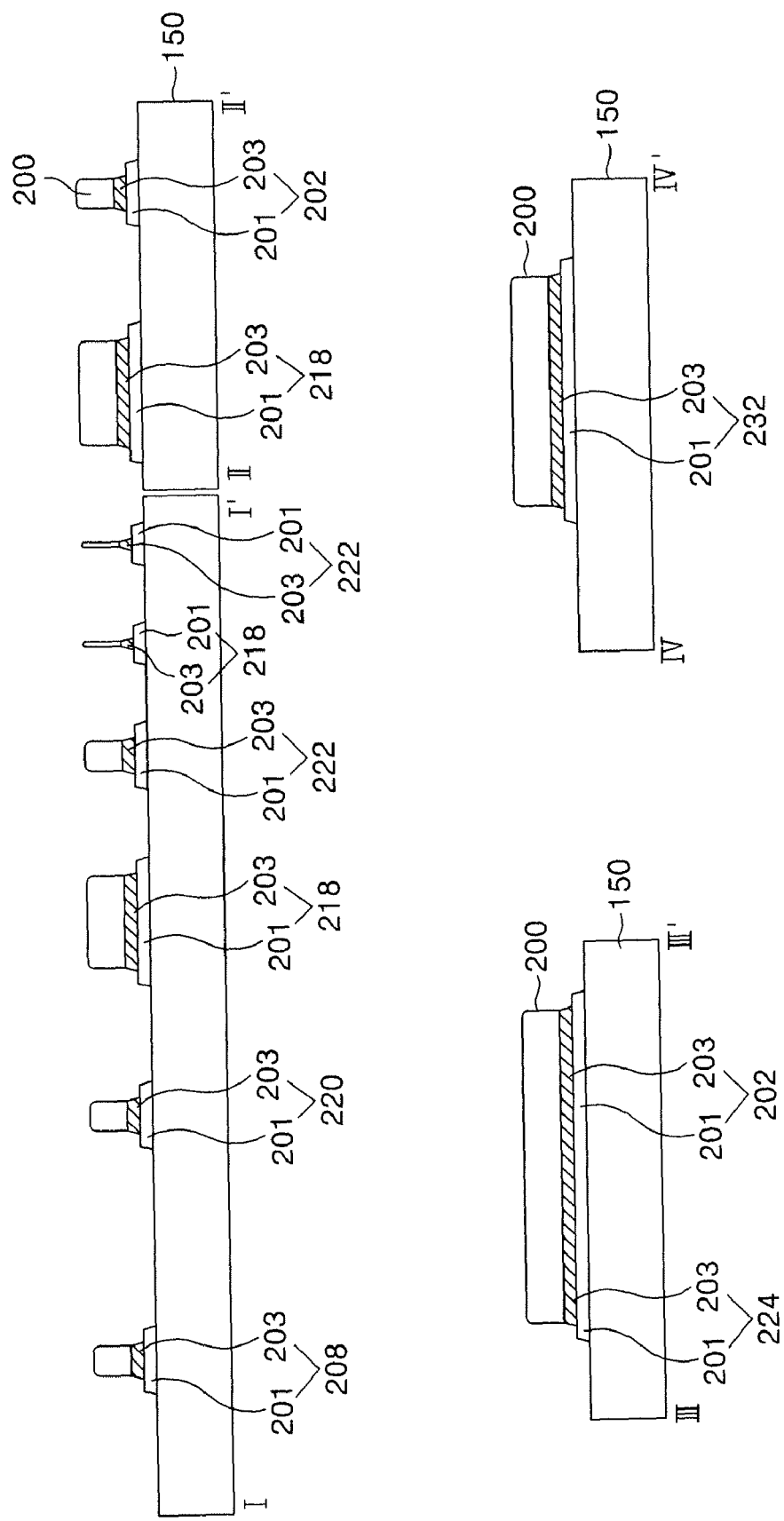
Figure 14C:
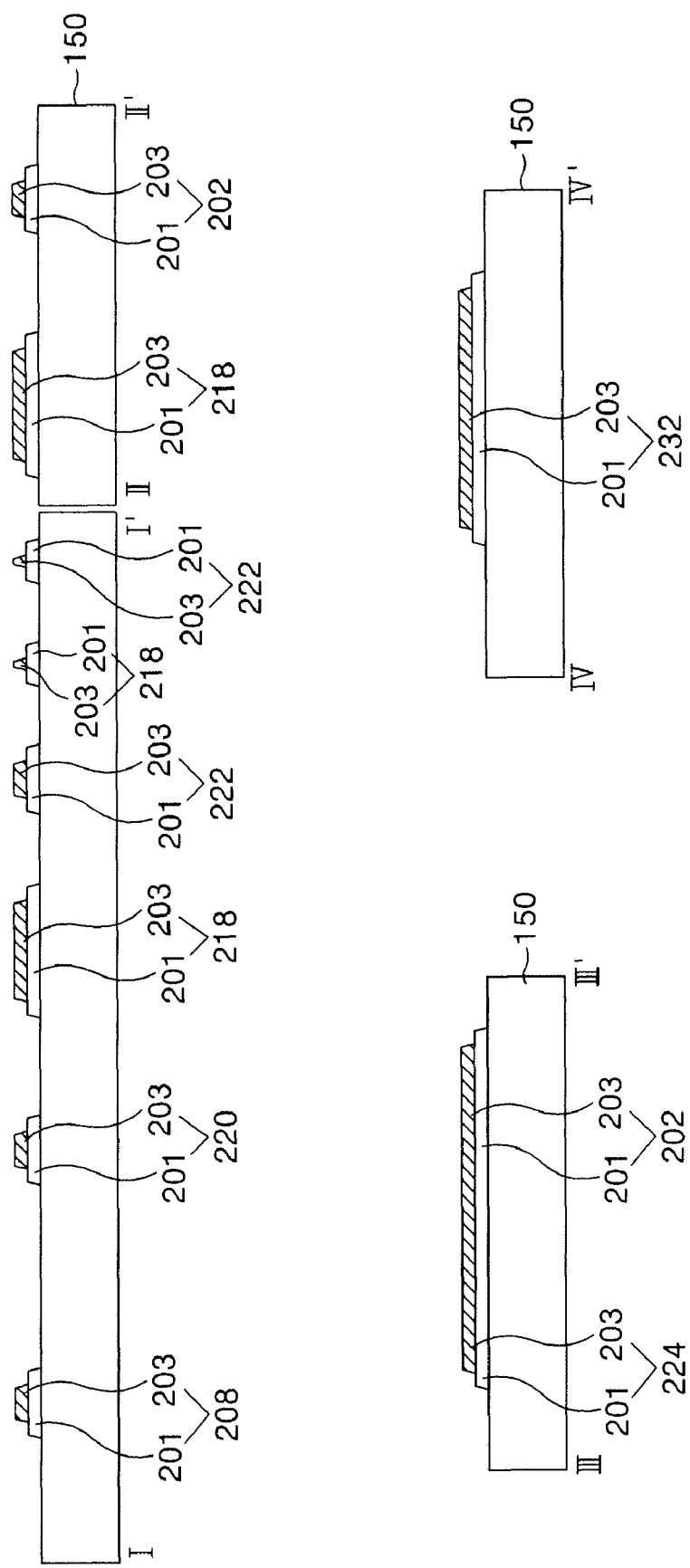

FIG. 13A and FIG. 13B are a plan view and a sectional view respectively for explaining a first mask process in a method of fabricating the thin film transistor substrate according to the third embodiment of the present invention. FIG. 14A to FIG. 14C are section views for specifically explaining the first mask process.

A first mask pattern group including the gate line 202, the gate electrode 208, the common line 220, the common electrode 222, the pixel electrode 218, the gate pad 224 and the data pad 232 is formed on the lower substrate 150 by the first mask process. The first mask pattern group has a multiple-layer structure of at least the first and second conductive layers 201 and 203. Herein, a surface of the first transparent conductive layer 201 is substantially exposed along an edge of the second substantially opaque conductive layer 203.

Referring to FIG. 14A, the first and second conductive layers 201 and 203 are disposed on the lower substrate 150 by a deposition technique such as sputtering, etc., and a photo-resist pattern 200 is formed on the second conductive layer 203 by the photolithography process. The first and second conductive layers 201 and 203 are etched by an etching process using the photo-resist pattern 200 as a mask, thereby providing the first mask pattern group including a multiple-layer structure gate line 202, gate electrode 208, common line 220, common electrode 222, pixel electrode 218, gate pad 224 and data pad 232. The first conductive layer 201 is formed of a transparent conductive material such as ITO, TO, IZO or ITZO, etc. On the other hand, the second conductive layer 203 employs a single layer formed of a metal material or has structure of at least double layers such as Mo, Ti, Cu, AlNd, Al, Cr, a Mo-alloy, a Cu-alloy or an Al-alloy, etc.

Referring to FIG. 14B, the photo-resist pattern 200 is ashed by an ashing process, thereby allowing a thickness and width of the photo-resist pattern 200 to be reduced. And, the second conductive layer 203 exposed by the ashed photo-resist pattern 200 as a mask is again etched, thereby allowing the first and second conductive layers 201 and 203 to have constant step coverage, so that the first conductive layer 201 is exposed along the edge of the second conductive layer 203.

Referring to FIG. 14C, the photo-resist pattern 200 left on the second conducive layer 203 of the first mask pattern group in FIG. 14B is removed by the stripping process.

Figure 15C:
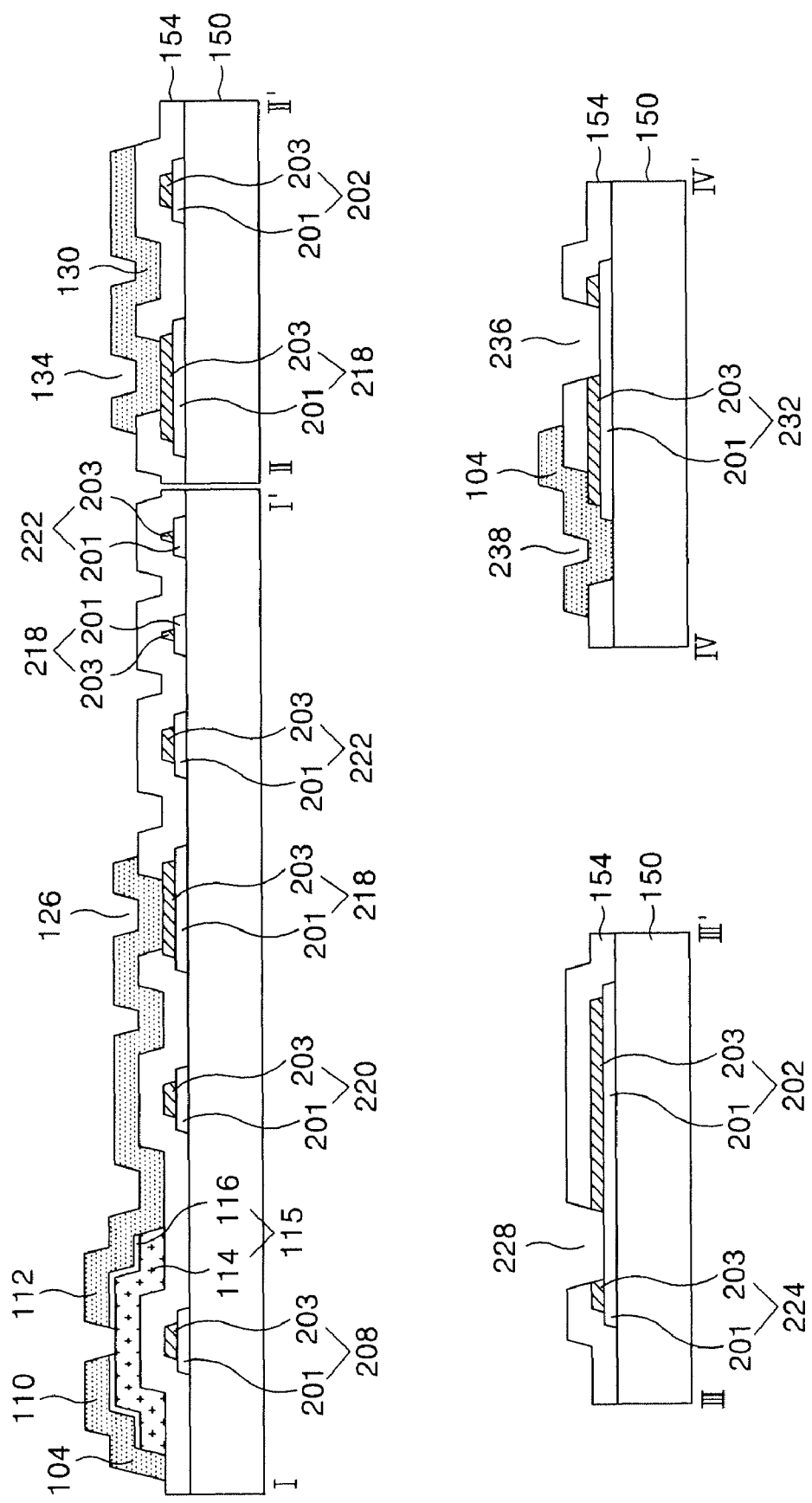

FIG. 15A to FIG. 15C are sectional views for specifically explaining a third mask process of the thin film transistor substrate according to the third embodiment of the present invention.

The gate insulating film 154 including a plurality of contact holes 126, 134, 228, 236 and 238, and the semiconductor pattern 115 are formed by the second mask process like the above-mentioned with respect to FIG. 6A to FIG. 7D.

The third mask pattern group including the data line 104, the source electrode 110, the drain electrode 112, the pixel connecting line 118a and the upper storage electrode 130 is formed on the gate insulating film 154 provided with the semiconductor pattern 115 by the third mask process, and the second conductive layers 203 of the gate pad 224 and the data pad 232 are exposed through the third and fourth contact holes 228 and 236. Also, an oxidized surface of the active layer 115 between the source electrode 110 and the drain electrode 112 is exposed.

Referring to FIG. 15A, the third conductive layer 205 is formed on the gate insulating film 154 provided with the semiconductor pattern 115 by a deposition technique such as sputtering, etc., and a photo-resist pattern 210 is formed on the third conductive layer 205 by the photolithography process. The third conductive layer 205 employs a single layer formed of a metal material or has at least double layers such as Mo, Ti, Cu, AlNd, Al, Cr, a Mo-alloy, a Cu-alloy or an Al-alloy, etc.

Referring to FIG. 15B, the third conductive layer 205 is patterned by the etching process using the photo-resist pattern 210 as a mask to thereby provide the third mask pattern group including the data line 104, the source electrode 110, the drain electrode 112, the pixel connecting line 118a and the upper storage electrode 130. In this case, the second conductive layers 203 of the gate pad 224 and the data pad 232 exposed through the third and fourth contact holes 228 and 236 is etched, to thereby expose the first conductive layer 201.

Furthermore, when the photo-resist pattern is removed, the ohmic contact layer 116 between the source electrode 110 and the drain electrode 112 is removed thereby allowing the active layer 114 to be exposed. The surface of the exposed active layer 114 is oxidized into $SiO_2$ by a surface process using the oxygen ($O_2$) plasma, so that the reliability of the channel can be maintained without the protective film. Also, the mask process such as the exposing process is not adjusted in the active layer 114, to thereby provide more stable device characteristics.

Referring to FIG. 15C, the photo-resist pattern 210 left on the third mask pattern group in FIG. 15B is removed by the stripping process.

Accordingly, the method of fabricating the thin film transistor substrate of horizontal electric field applying type according to the third embodiment of the present invention can be simplified by the three-round mask process.

As described above, in the thin film transistor substrate of a liquid crystal display device of horizontal electric field applying type and a fabricating method thereof according to the present invention, the first mask pattern group having a single-layer and a multiple-layer structures is formed with the aid of the first half tone (or a diffractive exposure) mask.

On the other hand, in the thin film transistor substrate of the liquid crystal display device of horizontal electric field applying type and the fabricating method thereof according to the present invention, the first mask pattern having a multiple-layer structure is formed and the photo-resist pattern is ashed, then an upper conductive layer thereof is again etched, thereby allowing a transparent conductive layer of the lower substrate to be exposed along outside of the upper conductive layer. Accordingly, the transparent conductive layer exposed from the common and pixel electrodes can contribute to brightness, and a substantially opaque conductive layer of the upper substrate prevents the light leakage, to thereby contribute to the contrast ratio.

Also, in the thin film transistor substrate of horizontal electric field applying type and the fabricating method thereof according to the present invention, a plurality of the contact holes and the semiconductor pattern are formed with the aid of the second half tone (or a diffractive exposure) mask.

Furthermore, in the thin film transistor substrate of horizontal electric field applying type and the fabricating method thereof according to the present invention, the third mask pattern group is formed, and then the active layer of the semiconductor pattern is exposed and the surface thereof is oxidized by the third mask. Accordingly, the reliability of the channel is improved, and the third mask pattern group is protected by the alignment film to be coated thereon, so that an extra protective film is not required. Also, the mask process such as the exposing process is not adjusted in the active layer, to thereby provide more stable device characteristics.

Accordingly, in the thin film transistor substrate of horizontal electric field applying type and the fabricating method thereof according to the present invention, the entire process can be simplified by the three-round mask process, so that it becomes possible to reduce the material cost and the equipment investment cost, etc. as well as to improve the productivity.

The above described liquid crystal display device and method of fabricating is applicable to not only a horizontal electric applying type, but to other embodiments, for example, fringe field switching (FFS), and to plasma display panel (PDP).

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
    a data line crossing a gate line on a substrate to define a pixel area;
    an insulating film between the gate line and the data line;
    a thin film transistor having a gate electrode, a drain electrode, and a source electrode, and connected to the gate line and the data line;
    a plurality of pixel electrodes connected to the thin film transistor in the pixel area;
    a plurality of common electrodes substantially parallel to the pixel electrodes in the pixel area;
    a common line connected to the common electrodes;
    a pad connected to at least one of the gate line, the data line and the common line; and
    a storage capacitor provided such that a pixel connecting line extending from the drain electrode of the thin film transistor overlaps with a portion of the common line with the insulating film therebetween,
    wherein the gate line, the gate electrode, the pixel electrodes, the common electrodes, the common line, and the pad include a transparent conductive layer,
    wherein at least a first of the common electrodes has a multiple-layer structure having a transparent conductive layer and a substantially opaque conductive layer.

2. The device of claim 1, wherein the gate line, the gate electrode and the common line have a multiple-layer structure including the transparent conductive layer and a substantially opaque conductive layer.

3. The device of claim 1, wherein an outermost one of the common electrodes in the pixel area has a multiple layer structure having the transparent conductive layer and a substantially opaque conductive layer.

4. The device of claim 1, wherein the gate line, the gate electrode, the common line, at least one of the common electrodes, at least one of the pixel electrodes and the pad have a multiple-layer structure including the transparent conductive layer and a substantially opaque conductive layer.

5. The device of claim 4, wherein the transparent conductive layer extends beyond an edge of the substantially opaque conductive layer.

6. The device of claim 5, wherein the transparent conductive layer of the pad is exposed through a contact hole passing through the substantially opaque conductive layer.

7. The device of claim 1, further comprising:
    a storage capacitor provided such that an upper storage electrode connected to at least one of the pixel electrodes overlaps with a portion of the gate line with the insulating film therebetween.

8. The device of claim 7, wherein the drain electrode and the upper storage electrode are connected to the at least one pixel electrode via a contact hole passing through the insulating film.

9. The device of claim 1, further comprising:
    a storage capacitor provided such that an upper storage electrode connected to at least one of the pixel electrodes overlaps with a portion of the gate line with the insulating film therebetween.

10. The device of claim 9, wherein the drain electrode and the upper storage electrode are connected to the at least one pixel electrode via a contact hole passing through the insulating film.

11. The device of claim 1, wherein a surface of a channel exposed between the source electrode and the drain electrode of the thin film transistor is oxidized.

12. The device of claim 1, wherein the thin film transistor and the data line are covered by an alignment film.

13. The device of claim 4, further comprising:
    a second insulating film on the multiple-layer structure including the transparent conductive layer of the gate line, the gate electrode, the at least one pixel electrode, the at least one common electrode, the common line and the pad.

14. The device of claim 1, wherein the data line is connected to the pad via a contact hole passing through the insulating film.

* * * * *